(12) United States Patent
Doronichev

(10) Patent No.: US 9,137,125 B1
(45) Date of Patent: Sep. 15, 2015

(54) VIDEO CONTENT PRE-FETCHING FROM MOBILE BROWSER

(71) Applicant: Google Inc., Mountain View, CA (US)

(72) Inventor: Andrey Doronichev, London (GB)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 13/632,692

(22) Filed: Oct. 1, 2012

(51) Int. Cl.
*H04L 12/24* (2006.01)
*H04N 21/65* (2011.01)

(52) U.S. Cl.
CPC .............. *H04L 41/509* (2013.01); *H04N 21/65* (2013.01)

(58) Field of Classification Search
None
See application file for complete search history.

(56) References Cited

U.S. PATENT DOCUMENTS

| | | | |
|---|---|---|---|
| 2007/0054658 A1 | 3/2007 | Guyard et al. | |
| 2009/0280784 A1* | 11/2009 | Mousseau et al. | 455/414.3 |
| 2011/0231517 A1* | 9/2011 | Srinivasan et al. | 709/219 |
| 2012/0110345 A1* | 5/2012 | Pigeon et al. | 713/189 |
| 2012/0124162 A1* | 5/2012 | Cassidy | 709/217 |
| 2012/0198050 A1* | 8/2012 | Maki et al. | 709/224 |
| 2013/0007200 A1* | 1/2013 | van der Schaar et al. | 709/217 |

FOREIGN PATENT DOCUMENTS

| | | | |
|---|---|---|---|
| EP | 2400720 | 12/2011 | |
| WO | 2012018431 | 2/2012 | |
| WO | WO2014/048477 A1 * | 4/2014 | H04L 29/06 |

OTHER PUBLICATIONS

IBM, "Method to Defer Mobile Device Download Until Optimal Bandwith Threshold or Battery Utilization," Feb. 18, 2009, 3 pages.

* cited by examiner

*Primary Examiner* — Nicholas Taylor
*Assistant Examiner* — Clayton R Williams
(74) *Attorney, Agent, or Firm* — Amin, Turocy & Watson, LLP

(57) ABSTRACT

Systems and methods for pre-fetching video content from a content server for eventual playback on a mobile device are disclosed herein. The system includes a component that creates a request for a video stored on a video content server, wherein the request can include a rule that can control and govern broadcast conditions implemented by the video content server in order to return the requested video to the requester. Additionally, the system can include a transmitting component that relays the request for the video to the content service for subsequent fulfillment of the request.

18 Claims, 20 Drawing Sheets

VIDEO CONTENT PRE-FETCHING FROM MOBILE BROWSER

TECHNICAL FIELD

This disclosure relates to video content and more particularly to pre-fetching video content from a content server or service for playback on a mobile device.

BACKGROUND

Currently, it is difficult to access mobile content, such as video, in many emerging markets since in these markets mobile internet can be exceedingly slow and expensive. Further, to compound the suffering, many emerging markets have not as yet deployed technologies that allow mobile devices to exchange data wirelessly over computer networks and/or high-speed Internet connections. Moreover, in these markets the majority of mobile devices are feature phones that typically do not allow for the building of application software designed to assist users to perform tasks. While most content provisioning websites, such as video sharing websites, provide dedicated service aspects for devices that operate under such straitened circumstances to acquire persisted content, streaming of such content can, nonetheless, be frustrating and, at the very least, it can take many hours to buffer such content.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular aspects of the disclosure, or any scope of the claims. Its sole purpose is to present some concepts of the disclosure in a simplified form as a prelude to the more detailed description that is presented later.

In accordance with one or more aspects and corresponding disclosure, various non-limiting aspects are described in connection with pre-fetching video content from a content server or service for playback on mobile devices.

In accordance with a non-limiting aspect, a system is presented comprising a generating component that creates a request for a video that is stored on a video content service, wherein the request includes a rule that governs a broadcast condition that is implemented by the content service to return the video. Further the system can also include a transmitting component that relays the request to the content service.

In accordance with another non-limiting aspect, presented is a method comprising using at least one microprocessor to execute computer executable instructions stored on at least one non-transitory computer readable medium to perform acts that can include generating a request for a video persisted on a content service, associating a rule with the request, and transmitting the request to the content service.

In yet another non-limiting aspect, a system is provided comprising a reception component that obtains a request for a video, wherein the request includes a rule associated with a broadcast condition under which a mobile device operates. Further, the system can also include a transmitter component that dispatches the video in conformance with the broadcast condition.

In still yet a further non-limiting aspect, a method is presented that comprises using at least one microprocessor to execute computer executable instructions stored on at least one non-transitory computer readable medium to perform acts that can include receiving a request for a video, wherein the request includes a rule associated with a mobile device, and transmitting the video to the mobile device in satisfaction of the rule.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

DETAILED DESCRIPTION

Figure 1:
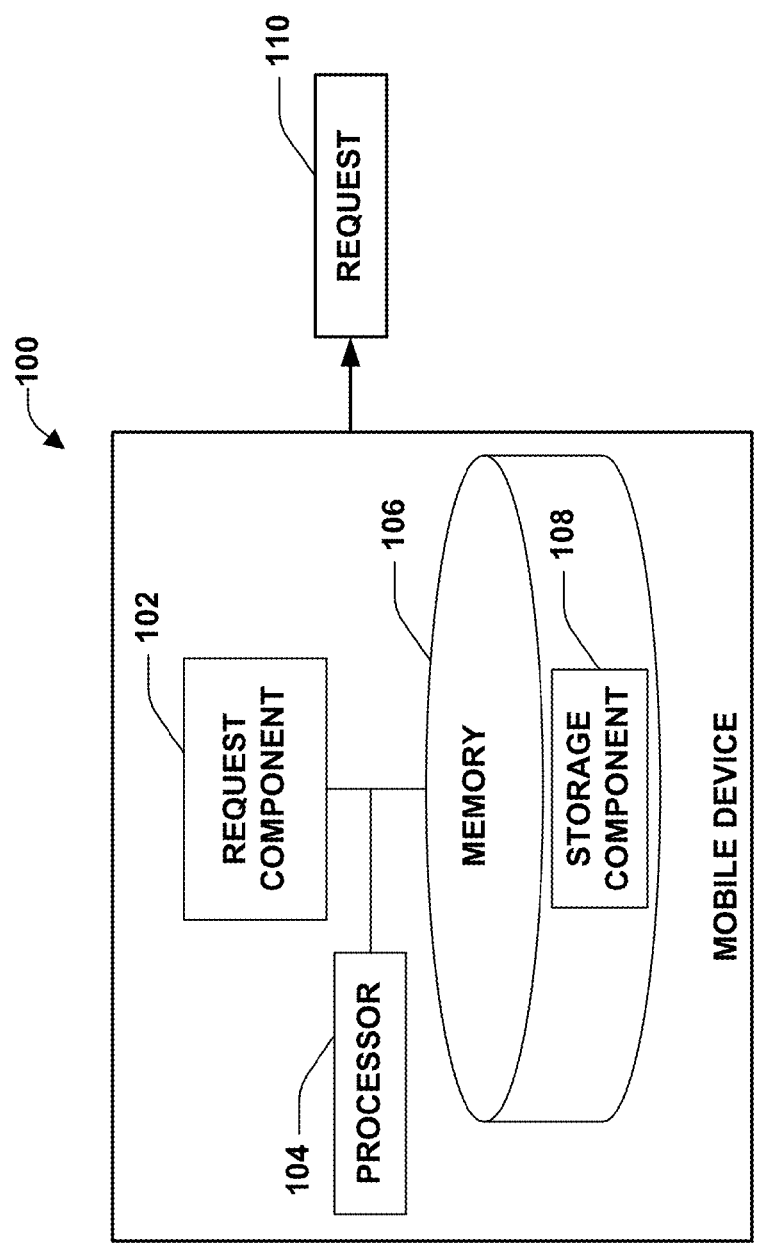
FIG. 1 illustrates an example non-limiting system that generates a request for media content of interest to a user of the system in accordance with various aspects and implementations described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more aspects or implementations described in this disclosure, users can opt-in or opt-out of providing personal information, demographic information, location information, proprietary information, sensitive information, or the like in connection with data gathering aspects. Moreover, one or more aspects or implementations described herein can provide for anonymizing collected, received, or transmitted data.

It is further to be appreciated that while the one or more aspects or implementations described below have been enunciated in the context of pre-fetching video content or collections of video content, the subject application is not necessarily so limited. Other objects, content, or collections of objects and/or content, such as playlists, channels, users, and the like can be pre-fetched with equal facility using the one or more described implementations or aspects set forth herein without departing from the purview or spirit and intent of this disclosure.

It should be noted that as utilized in this disclosure, that a prototype-based scripting language or a prototype-oriented programming language or instance based scripting language is one where classes are not present and behavior reuse is performed by cloning existing objects to serve as prototypes. Generally, prototype-based scripting languages utilize a feature known as delegation, wherein the language runtime dispatches the appropriate method and/or finds the correct item of data through use of delegation pointers (from object to prototype) until a match is identified. Unlike the class and instance relationship typical in class-based programming languages, in prototype-based languages the relationship between the prototype and its progeny does not require child objects to have a memory or structural similarity to the prototype beyond the link. Accordingly in prototype-based programming languages, child objects can be modified and/or amended without rearranging the structure of its associated prototype as is the case in class-based programming paradigms.

A class-based scripting language or a class-based computer programming language, in contrast, employs a class-based programming paradigm, wherein the structure of objects is specified in programmer-defined types known as classes. The classes define the type of data and functionality that objects have, and instances are "usable" objects based on the patterns of a particular class. In this model, classes act as collections of behavior (methods) and structure that are the same for all instances, whereas instances carry the objects' data.

As will thus be appreciated, class-based programming languages encourage a model of development that focuses first on the taxonomy and relationships between classes; whereas prototype-based programming languages, in contrast, encourages the programmer to focus on the behavior of some set of examples and only later worry about classifying these objects into archetypical objects that are subsequently used in a fashion similar to classes. As such, prototype-based programming languages encourage the alteration of prototypes during runtime; while class-based object oriented programming languages generally do not allow classes to be altered during execution of the program.

Additionally, in the context of the implementation of the subject application using a prototype-based programming paradigm, it should be noted, in contrast to class-based programming models, that utilization of a prototype-based programming paradigm on a mobile device can yield significant space savings in terms of the number of code lines necessary to effectuate the subject application with only a marginal reduction in processing speed. Given the fact that downloading of content by mobile devices can be computationally expensive and/or resource exhaustive, a reduction in code size with minimal reduction in processing efficiency can permit more of the limited resources associated with the mobile device to be dedicated and/or allocated to the process of downloading media content.

The subject application exists in a middle ground between media downloading and media streaming, as it allows a media streaming service to deploy media content in a media downloading environment (e.g., environments that are presently common in less developed markets, such as China, India, and much of the continent of Africa, where media downloading is the norm). Media downloading is characterized as being a bulk download of content from a content server/service to a client device or mobile device. The content server pushes the media content to the client device or mobile device as fast as resources available for the bulk download will allow. Media playback in the context of media downloading generally does not commence until the entirety of the media content has been persisted on the mobile device or client device. In contrast in media streaming, the content server/service supplies sufficient content to enable immediate playback of the media content on the mobile device or client device and at a rate commensurate with the playback rate of the content on mobile device or client device.

In many emerging markets, cellular/mobile networks have become one of the main ways of accessing the Internet. In India, for instance, research shows that access to the Internet from mobile devices or mobile handsets, through cellular networks, surpasses usage through desktop computers. This means that a growing number of users are accessing the Internet through a relatively slow and/or limited connection—the cellular network. Additionally, in emerging markets users typically have cellular or mobile devices or mobile handsets that generally are limited in features, in contrast to full-featured devices, such as smart phones and tablet computers, typically found in more developed markets.

Mobile devices typically used in emerging markets to access the Internet through cellular networks generally lie somewhere between full-featured smart phones and ordinary cell phones, wherein the ordinary cell phones are associated with a constrained set of rudimentary features inclusive of a browser. While the cellular network technology in emerging markets might provide 3G connectivity, the ability of users to beneficially utilize the features provided by 3G technologies can be severely curtailed by their access technologies—limited featured mobile devices or cell phones.

In view of the foregoing, the subject application describes a browser extension that can operate on a mobile device that has limited capabilities. In order to enable full access to the streaming services provided by content sharing websites, there needs to be decent connectivity—which in emerging markets is not the case. To overcome this shortcoming many content sharing websites utilize a facility known as content offloading which involves, while the mobile device is connected through a relatively fast Wi-Fi network, prefetching media content and thereafter persisting the prefetched media content to storage associated with the mobile device. Thus, when the mobile device transitions to a relatively slower wired and/or wireless cellular network, when metadata from the content server is requested by the mobile device, it can be realized at that point that the media content has already been prefetched and persisted to the storage associated with the mobile device, at which point the media content can immediately be played back on the mobile device. By prefetching or pre-caching the media content, over relatively fast Wi-Fi connectivity prior to ultimate playback, delays associated with buffering, and the like, can at least be mitigated or at the best obviated entirely.

In emerging markets Wi-Fi connectivity is not commonplace; rather connectivity may solely be through wired and/or wireless cellular networks that have implemented the 3G technical standard, for example. While utilization of wired and/or wireless cellular networks in this context can be expensive, cellular carriers are nonetheless focused in maximizing returns on their investments; utilization of wired and/or wireless cellular networks throughout an entire 24-hour period can be conducive to attaining such maximization. Thus, in order to incentivize use of the wired and/or wireless cellular network for an entire 24-hour period, cellular network carriers can discount use of bandwidth during off-peak hours, for example. Additionally and/or alternatively, cellular network carriers can offer data plans that incentivize or encourage use of the wired and/or wireless cellular network during night hours and/or over statutory holiday periods.

The disclosed offloading strategy, as implemented in emerging markets, for example, operates on mobile or cellular devices that generally have limited capabilities—for instance, a mobile device that, in addition to providing standard call capabilities (receiving and/or initiating telephone calls) has a rudimentary browser capability. The offloading strategy schedules the download of media content from a content service during off-peak periods, for example. Off-peak periods are generally periods when use of the wired and/or wireless cellular network at best is free or at the very worst involves a minimal cost, and traffic over the wired and/or wireless cellular network is minimal or negligible.

Generally, the media content service is typically exposed through a web browser aspect that can be executing on a mobile device. Exposure of the media content service or content server (e.g., a repository of media content) through the web browser associated with the mobile device can be implemented using a prototype-based scripting language (e.g., a scripting language that is dynamic, weakly typed and has first-class functions) application programming interface (API), for example. The content service (e.g., executing on a content server) and the application programming interface (e.g., executing on a mobile device) can be communicatively coupled (temporarily, periodically, and/or continuously) with one another through the wired and/or wireless cellular network, for instance. The application programming interface can, for example, notify the media or content service that particular media content should be downloaded to the mobile device during off-peak periods or whenever it is ascertained to be beneficial and/or convenient to do so consonant with a set of constraints (wherein the set of constraints includes at least one constraint, and thus is not an empty or null set) provided by the mobile device to the content service. Once media content has been downloaded from the media or content service to the mobile device, the application programming interface can notify the user of the mobile device that the media content has been downloaded and that the media content is ready for playback.

In addition to the foregoing, the application programming interface operating through the web browser situated on the mobile device can also include a queuing aspect that allows a user to select a plurality of media content for download from the content server/content service. The application programming interface feature conveys the requests for multiple media content to the media or content service in association with at least one rule that governs the conditions under which each of the plurality of identified and/or selected media content should be dispatched from the content server/content service to the mobile device. When media content is queued for future or subsequent download from the content server/content service to the mobile device, an indication can be provided to the user, through the application programming interface, that the requested media content has been queued for download and/or is in the process of being downloaded to the mobile device. Additionally and/or alternatively, where media content is currently being downloaded to the mobile device an indication of the progress being made in fulfillment of the download can also be provided.

One illustrative and non-limiting transaction by which the foregoing can be accomplished and/or implemented can be as follows. Users can initially access, through a browser operating on the mobile device, a content server/content service. Upon gaining access to the content server/content service, users can identify or select media content that they wish to download and view on their mobile devices. Subsequent to users having identified or selected media content that they wish to download and/or view on their mobile devices, the content server/content service can immediately commence downloading the media content to the mobile device. However, as a consequence of the limitations of wireless or wired cellular networks prevalent in emerging markets, for instance, the content server/content service can come to the realization that the downloading of the media content is taking an inordinate amount of time to download, because, for instance, the download process is primarily involved in buffering the content rather than conveying the content to a persistence means associated with the mobile device. In recognition of the fact that the content server/content service is performing buffering rather than downloading media content to mobile device, the content server/content service can, for example, place the extant operational download process into a background mode, wherein the download is performed during off-peak periods or in accordance with a set of rules and/or constraints that can have been supplied during the earlier identification and selection process.

It should be noted that the application programming interface employed to access the content server/content service, and running on the mobile device, can include facilities to prioritize tasks operating on the content server/content service. Thus, for instance, while a mobile device is collaborating in downloading media content from the content server/content service to the mobile device, if the user initiates an emergency call on the mobile device, the application programming interface can reduce the priority of the task associated with downloading media content from the content service/content server for the duration of the call. Once a higher priority task has been completed the task placed in abeyance can be restarted and/or reassigned a higher priority by the application programming interface. As noted above, on completion of the downloading, the application programming interface can notify the user that the media content is ready for playback.

In accordance with a non-limiting outline therefore, the disclosure sets forth a method that can comprise using at least one microprocessor to execute computer executable instructions stored on at least one non-transitory computer readable medium to: generate a request for a video hosted by a content service, wherein the content service is exposed to a mobile device using a web browser implemented using a prototype-based scripting language application programming interface; associate a rule with the request, wherein the rule is employed by the content service to return the video to mobile device as a function of a broadcast condition included in the rule that regulates the return of the video; and transmit the request that includes the rule from the mobile device to the content service.

Further, the method can include receiving the video in response to the transmission of the request, wherein the content service/server, as a function of the rule, ascertains a condition under which it is permissible to broadcast a video. Additionally, the method can include receiving the video in response to the transmission of the request, wherein the content service/server, as a function of the rule, ascertains a broadcast service to employ and over which to broadcast the video. Moreover, the method can also include transmitting a resource status indicator to the content service/server, wherein as a function of receiving the resource status indicator the content service/server adjusts a condition specified in the rule in regard to returning the video. Typically, the resource status indicator divulges to the content service/server that a threshold value associated with at least one processor has been surpassed and/or that a set point associated with a power source, such as a battery, has been contravened or breached. The content service/server can employ the threshold value associated with the at least one processor and/or the set point associated with the power source (e.g., battery) associated with the at least one processor to adjust transmission of the requested video in response to the received resource status indicator.

Moreover, the method can also include encrypting the video on receipt of the video from the content service/server and/or persisting the video in a secure location associated with the at least one non-transitory computer readable medium.

In accordance with a further non-limiting synopsis, the disclosure elucidates a further method comprising using at least one microprocessor to execute computer executable instructions stored on at least one non-transitory computer readable medium to perform: receiving, from a mobile device, a request for a video, wherein the request includes a rule associated with a broadcast condition associated with the mobile device and the mobile device has identified the computer system through use of a prototype-based scripting language implemented web browser, and transmitting the video to the mobile device in satisfaction of the broadcast condition that controls transmission of the video to the mobile device.

The foregoing method can also include ascertaining, as a function of the rule, a time period during which to transmit the video from a content server/service to the mobile device, and ascertaining, as a function of the rule, a broadcast service that is to be employed to transmit the video from the content server/service to the mobile device. Furthermore, the method can also include receiving a resource indicator from the mobile device, wherein the resource indicator, in conjunction with the rule, is utilized by the content server/service to adjust the transmitting of the video from the content server/service to the mobile device. The resource indicator generally relates a prospective inability of at least one processor associated with the mobile device to perform a computer executable instruction associated with receiving the video.

In accordance with a further non-limiting overview, the disclosure describes a system that can comprise at least one non-transitory computer readable medium having stored thereon computer-executable components and at least one microprocessor that executes the computer executable components stored on the at least one non-transitory computer readable medium. The described system can include a generating component that creates a request for a video that is stored on a video content service, wherein the video content service is exposed to a mobile device through an associated web browser that has been implemented using a prototype-based scripting language, and a rule engine that generates a rule that governs downloading of the video from the video content service as a function of a broadcast condition that is implemented by the video content service to return the video, wherein the request includes the rule. Further, the system can also include a transmitting component that relays the request to the content service.

The foregoing system can further comprise a persistence component that, on receipt of the video from the content service, stores the video to a secure location on the at least one non-transitory computer readable medium. Additionally, the system can also include an encryption component that, on receipt of the video from the content service, encrypts the video prior to persisting the video to the at least one non-transitory computer readable medium.

In accordance with yet a further non-limiting outline, the disclosure sets forth a further system that includes at least one non-transitory computer readable medium having stored thereon computer-executable components and at least one microprocessor that executes the computer executable-components stored on the at least one non-transitory computer readable medium. The system can comprise a reception component that obtains a request for a video, wherein the request includes a rule associated with a broadcast condition under which a mobile device operates and the rule controls downloading of the video based on the broadcast condition, and wherein the system is exposed to the mobile device through a web browser associated with the mobile device that has been implemented using a prototype-based scripting language. Additionally, the system can also include a transmitter component that dispatches to the requesting mobile device the video in conformance with the broadcast condition.

The transmitter component associated with the noted system, as a function of the broadcast condition included in the rule, can ascertain a time period during which it is beneficial to dispatch the video from the content server/service to the mobile device. Additionally, the transmitter component, once again as a function of the broadcast condition included in the rule, can determine or select a broadcast service to employ in order to dispatch the video, from the content service, to the mobile device. Further, in the context of the reception component, this component can receive a subsequently dispatched resource indicator communicated by the mobile device, wherein the resource indicator can be utilized in conjunction with the rule to modify operation of the transmitter component during dispatch of the video from the content service to the mobile device.

Turning now to the drawings, with reference initially to FIG. 1, a non-limiting depiction of a system 100 (e.g., a mobile device, cellular device, mobile handset, user equipment, . . . ) that generates a request 110 for media content of interest to a user of system 100 is presented. Aspects of the systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing devices(s), virtual machines(s), etc. can cause the machine(s) to perform the operations described. System 100 can include memory 106 for storing computer executable components and instructions. A processor 104 can facilitate operation of the computer executable components and instructions by the system 100.

In accordance with an aspect, system 100 can include request component 102, processor 104, memory 106, and storage component 108. System 100 represents a system employed on one or more server components or devices which generates and dispatches a request 110 to a content service/content server for download of media content, such as video content. In an aspect, a storage component 108 stores content, such as video files, downloaded from the content service/server.

Request component 102 generates a request 110 for media content, such as a video or other audio/visual content, that can have typically been persisted in a repository (e.g., storage media or database(s)) associated with a content service/content server. Additionally, request component 102 can associate a rule with the generated request 110 that is ultimately transmitted to the content service/content server for fulfillment. The rule associated with the request 110 that is transmitted to the content service or/content server will typically include the conditions under which the content server/content service should return the requested video to system 100. For instance, if the mobile device (e.g., system 100) operates under a particular data plan provided by a cellular network provider, the rule included with request 110 can include the times during which utilization of the cellular network is free or can be used for a nominal fee/tariff (e.g., during the night hours, during weekend periods, and/or over statutory holidays). Additionally, the rule associated by request component 102 with request 110 can also include constraints associated with mobile device 100, such as, current power source (e.g., battery) life, processor 104 speed/limitations, memory 106 capacity, available memory 106 capacity, and the like.

Further, request component 102 can, subsequent to dispatch of request 110 to content server/content service, can continuously, randomly, and/or periodically transmit updates to the content server/content service. These updates can include further constraints regarding the mobile device 100 that can have changed during the interim after request 110 has been dispatched to the content server/content service. These updates can include: changes that have, or might have occurred, and/or are predicted to occur, with regard to transmission and/or reception characteristics associated with the wired and/or wireless cellular network; changes that have, or might have occurred, and/or are predicted to occur, with respect to mobile device 100, such as changes in processor 104 capabilities (e.g., whether the processor 104 has become, or is predicted (using an inference engine (discussed infra)) to become, idle or is operating at full or near full capacity); and/or other resources that can have been fully or partially released and/or have become constrained, or further constrained, in the interim duration since the dispatch of request 110 to content server/content service. The updates can be employed by the content server/content service to modify the rules that were previously transmitted by mobile device 100 in the (or during) transmission of the request for media content.

Figure 2:
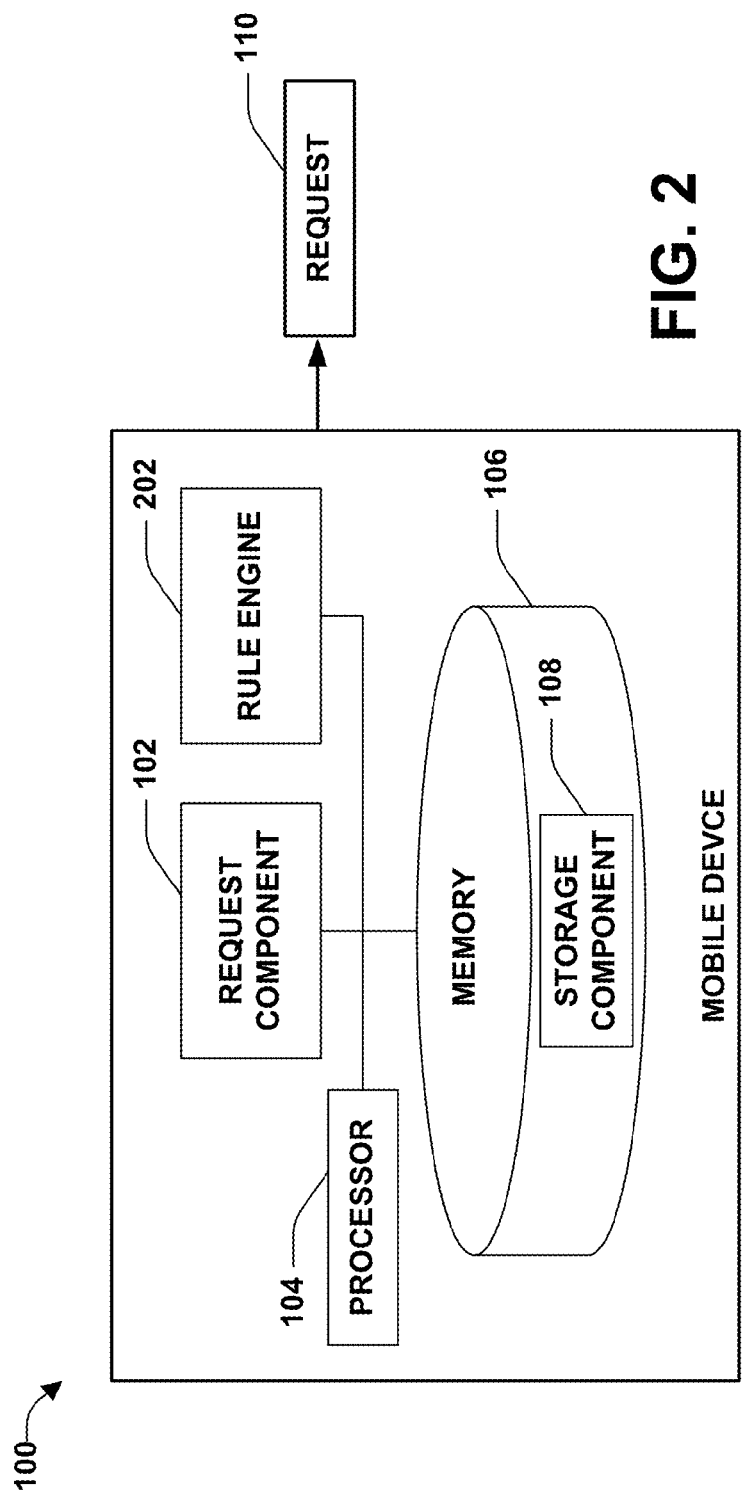
FIG. 2 illustrates an example non-limiting depiction of system that dispatches a request to a content server/content service requesting that the content server/content service return one or more media content persisted or associated with the content server/content in accordance with various aspects and implementations described herein.

Turning now to FIG. 2 that provides a further non-limiting illustration of system 100 that dispatches a request 110 to a content server/content service requesting that the content server/content service return one or more media content persisted or associated with the content server/content service. As illustrated, system 100 can include, in addition to request component 102, rule engine 202 that can be used in conjunction with request component 102 to include and/or associate rules that can be utilized by a content server/content service to return a requested video. Rule engine 202 can generate, associate, and/or include rules relating to the ambient wireless and/or wired cellular network conditions under which system 100 is currently operating. Rules relating to the ambient wireless and/or wired cellular network conditions under which system 100 is currently operating can be ascertained as a function of factors such as, received signal strength, bit error rate, block error rate, forward error correction, signal to interference and noise ratio, signal to interference ratio, and the like. Additionally and/or alternatively, rules generated by rule engine 202 can also be based on, or be ascertained as a function of, factors associated with system 100 itself, for instance, current processing capacity (or lack thereof), current power requirements and/or the diminution of power resources (e.g., battery life), storage capacity (or lack thereof), and the like.

Figure 3:
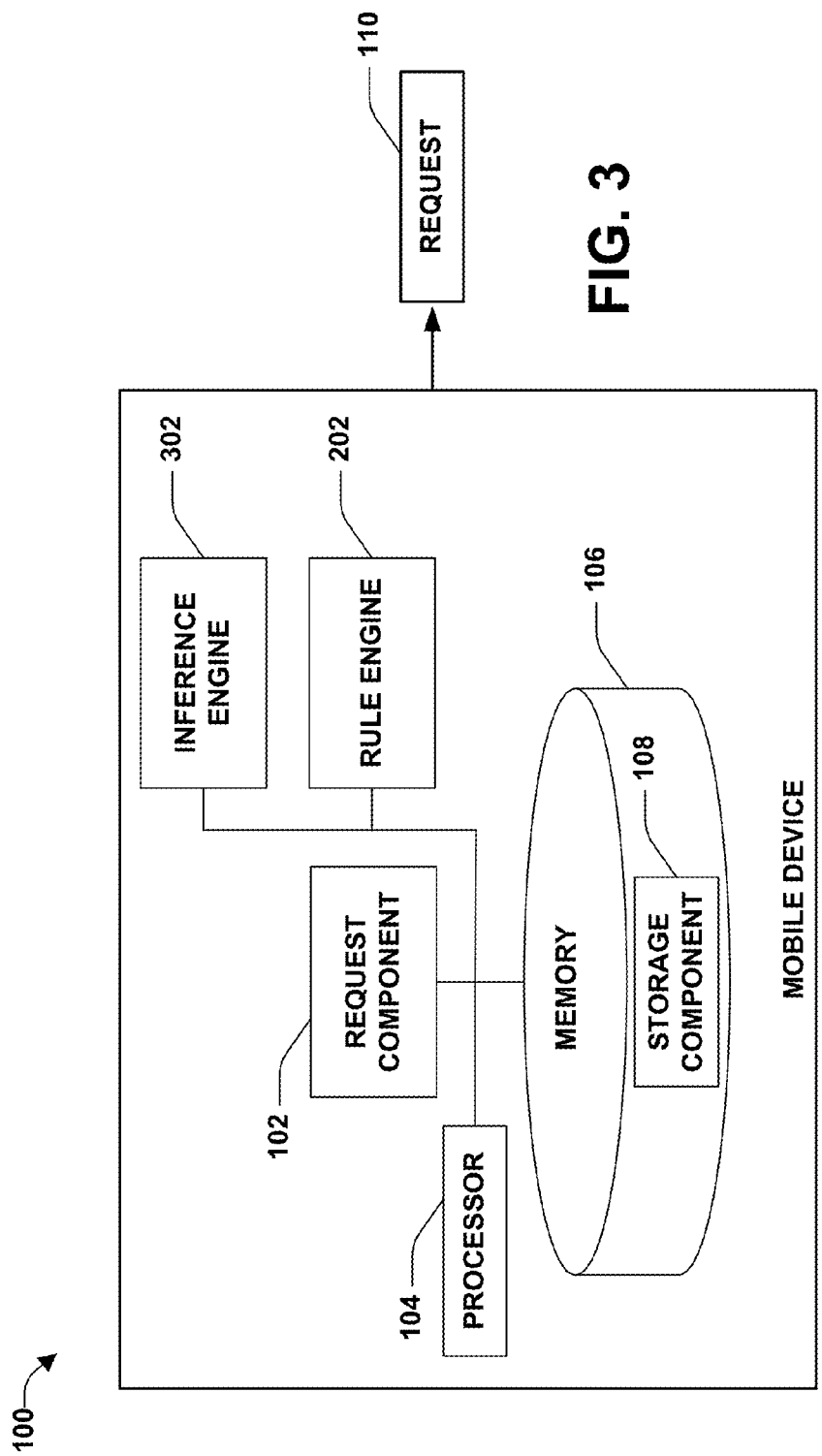
FIG. 3 illustrates an example non-limiting depiction of a further system that dispatches a request to a content server/content service requesting that the content server/content service return media content, persisted or associated with content server/content service, as solicited in the request in accordance with various aspects and implementations described herein.

FIG. 3 provides a further non-limiting illustration of system 100 that dispatches a request 110 to a content server/content service requesting that a content server/content service return media content, persisted or associated with the content server/content service, as solicited in the request 110. System 100, in addition to request component 102 and rule engine 202, can include inference engine 302. Inference engine 302 can be utilized to provide inferences regarding putative conditions that might occur in the future based on or as a function of past results. Further, inference engine 302 can infer prototypical attributes about the ambient wired and/or wireless cellular network and/or factors associated with processing capacity and power requirements required by system 100.

Inference engine 302 can be utilized, for example, to dynamically ascertain one or more of thresholds or set points associated with the ambient wired and/or wireless cellular network as well as thresholds and set points associated with processing capacity and/or power requirements needed by system 100. Inference engine 302 can employ a probabilistic based and/or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Inference engine 302 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. Inference engine 302 can factor historical data, extrinsic data, context, data content, state of the user, and/or can compute a cost of making an incorrect determination or inference versus a benefit of making a correct determination or inference. Accordingly, a utility-based analysis can be employed with providing such information to other components or taking automated action. Ranking and confidence measures can also be calculated and employed in connection with such analysis.

Figure 4:
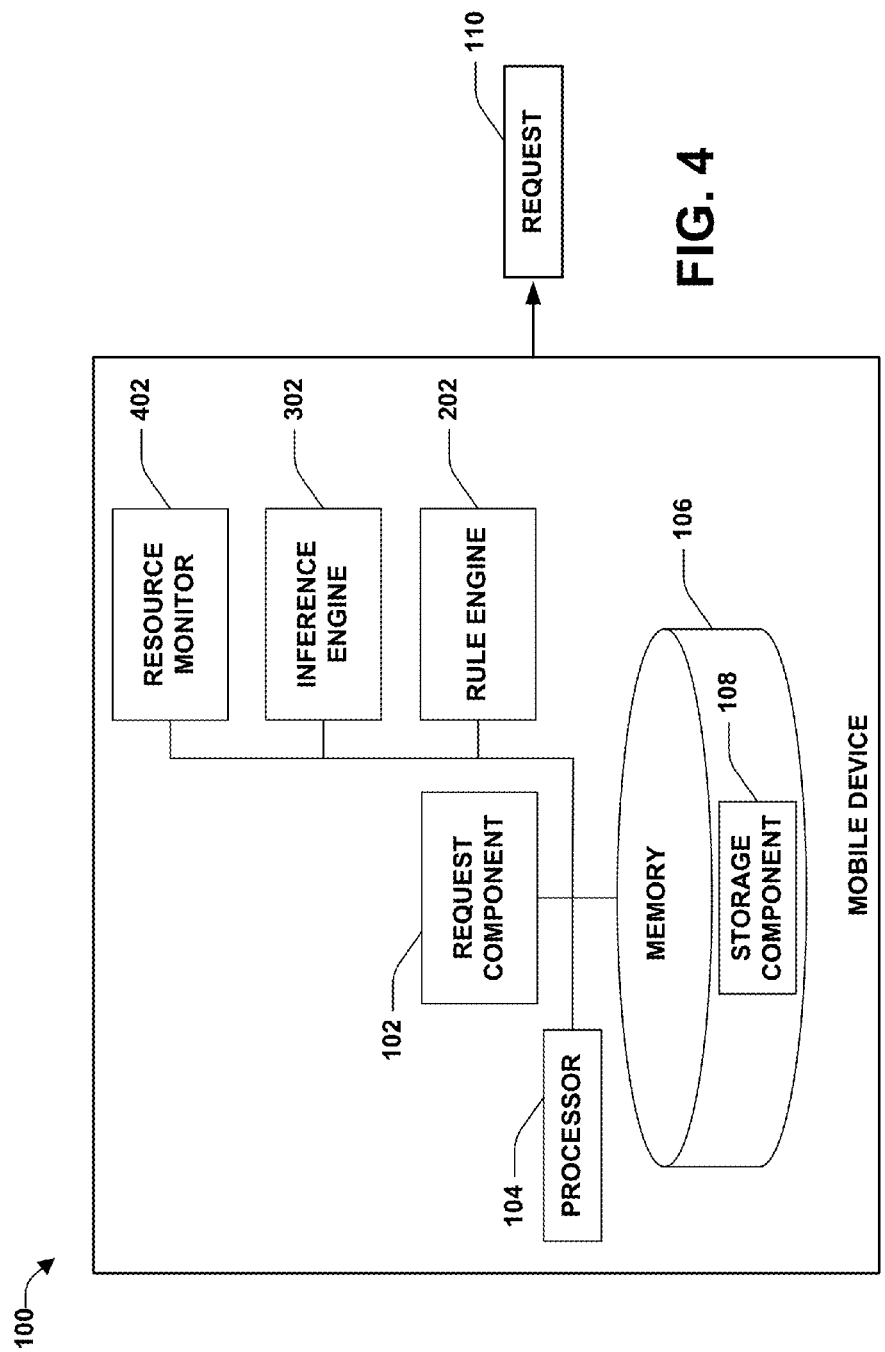
FIG. 4 illustrates an example non-limiting depiction of another system that dispatches a request, to a content server/content service, requesting that the content server/content service return one or more media content persisted or associated with the content server/content service in accordance with various aspects and implementations described herein.

FIG. 4 provides yet a further non-limiting illustration of system 100 that dispatches a request 110, to a content server/content service, requesting that the content server/content service return one or more media content persisted or associated with the content server/content service. System 100, in addition to request component 102, rule engine 202, and inference engine 302, can also include resource monitor 402 that can be employed by rule engine 202 and/or inference engine 302 to continuously, periodically, and/or at random intervals or periods monitor the resources associated with mobile device 100, and thereafter forward updates, via a transceiver component (discussed infra), to the content server/content service. Generally, resource monitor 402 monitors ambient environmental conditions associated with the cellular network to which system 100 is communicatively coupled. Additionally and/or alternatively, resource monitor 402 monitors conditions associated with the various associated componentry included in system 100, such as, processor 104, memory 106, power sources, etc.

Figure 5:
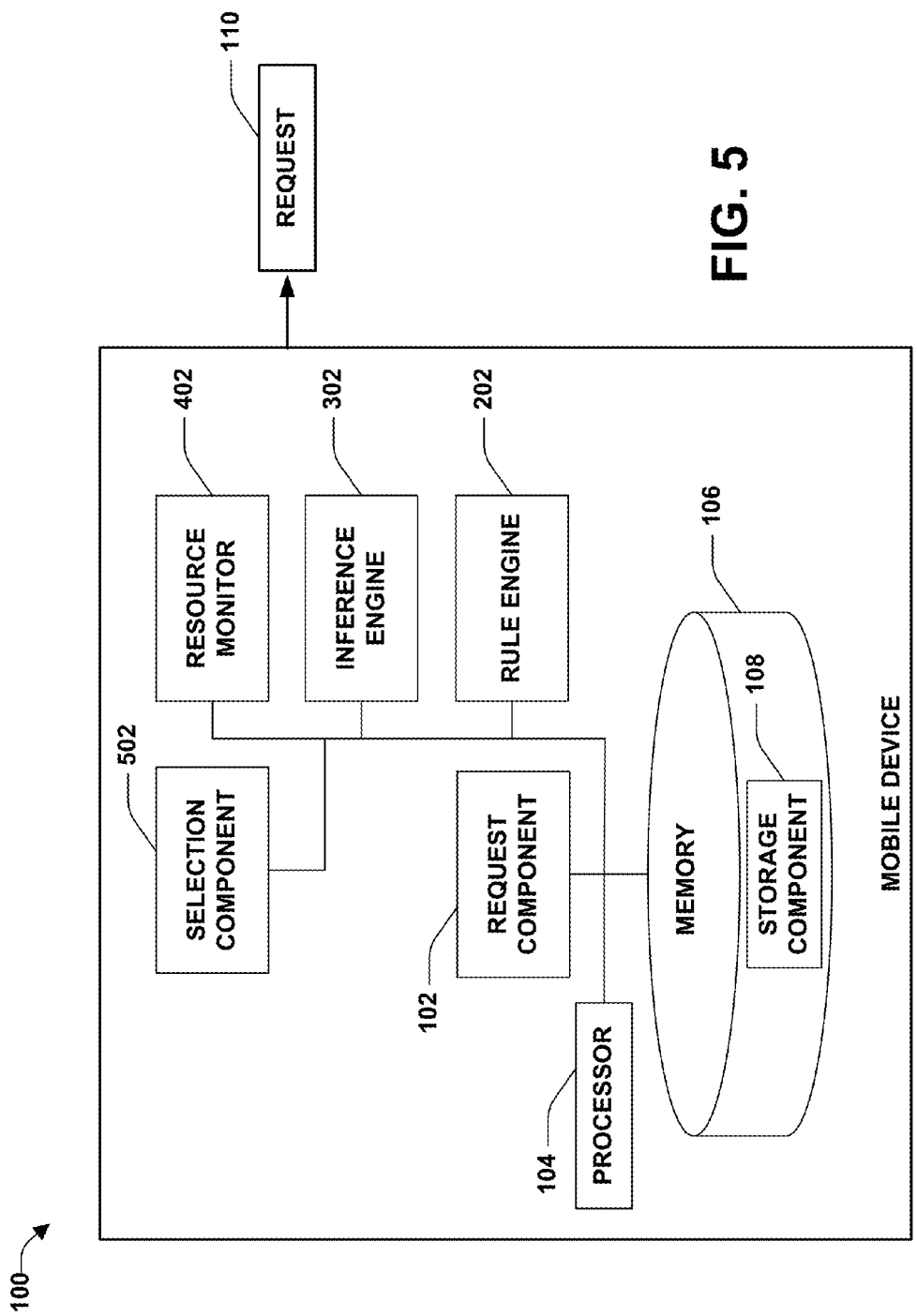
FIG. 5 illustrates an example non-limiting depiction of a system that transmits a request to a content server/content service requesting that content server/content service respond with one or more media content associated with the content server/content service in accordance with various aspects and implementations described herein.

FIG. 5 provides yet a further non-limiting illustration of system 100 that transmits a request 110 to a content server/content service requesting that the content server/content service respond with one or more media content associated with the content server/content service. As illustrated, system 100, in conjunction with inference engine 302 and/or request component 102, for instance, include selection component 502 that can be employed to provide suggestions regarding media content that should be obtained from a content service/content server. The suggestions can be generated as a function of a user's past preferences, for example. Additionally and/or alternatively, suggestions for media content to be obtained, by dispatch of request 110, from a content service/content server that can employ a collaborative filtering approach.

Utilization of selection component 502, in collaboration with inference engine 302 and/or request component 102, in order to solicit media content to which a user of system 100 might express an affinity, can reduce the amount of time needed to download the media content from the content server/content service. For example, if in the past the user has expressed a preference for science fiction media content, selection component 502 in accordance with an aspect can preemptively or anticipatorily download such content in response to an inference being made and/or generated by inference engine 302 that such a download would likely satisfy the user's preferences.

Figure 6:
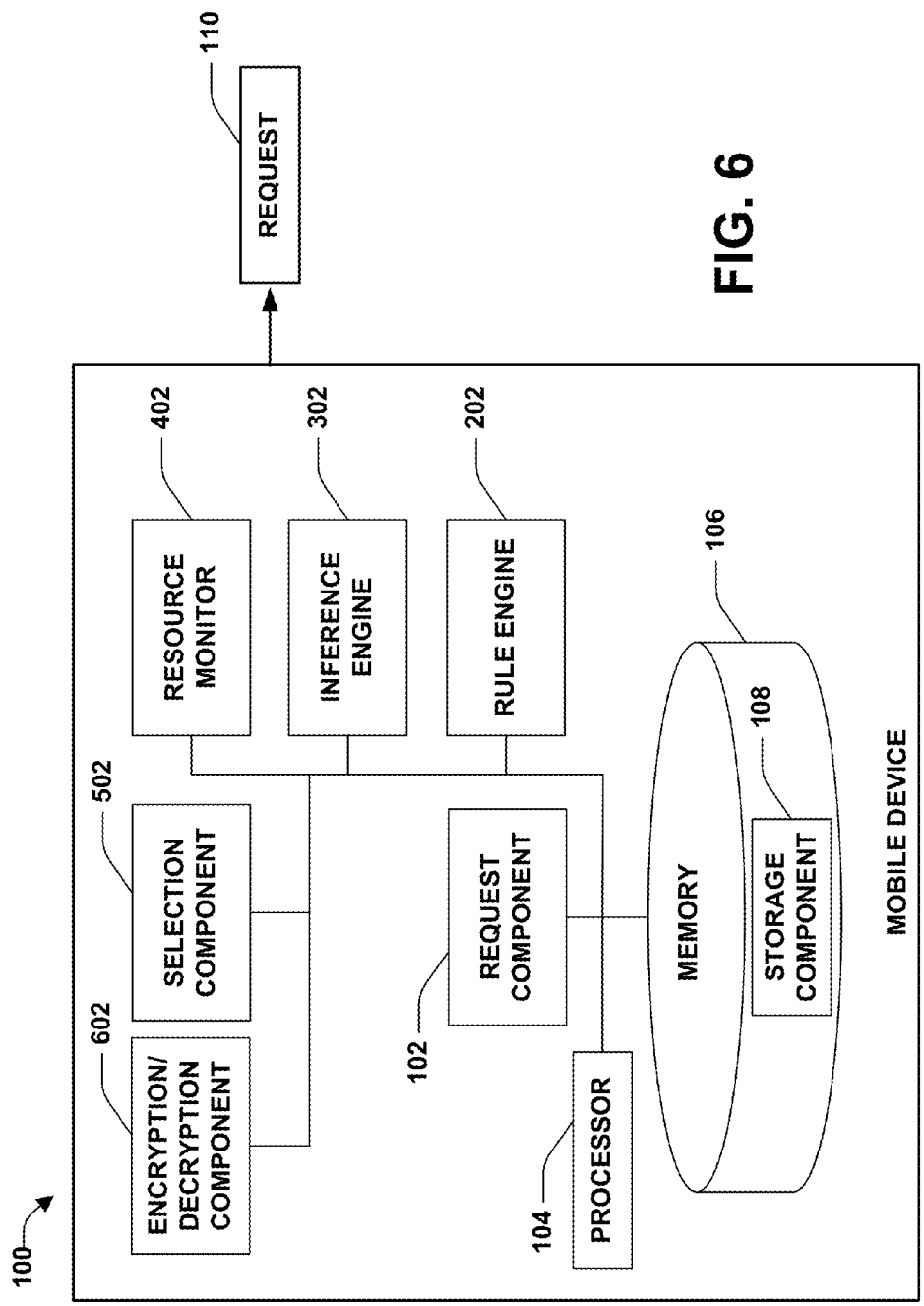
FIG. 6 illustrates an example non-limiting system that transmits a request to a content server/content service soliciting media content server/content service to respond with one or more media content previously persisted in databases associated with the content server/content service in accordance with various aspects and implementations described herein.

FIG. 6 provides another non-limiting illustration of system 100 that transmits a request 110 to a content server/content service soliciting media content server/content service to respond with one or more media content previously persisted in databases associated with the content server/content service. As illustrated, system 100 can include encryption/decryption component 602 that can facilitate the encryption of media content being written to memory 106 and/or storage component 108 and/or decryption of data being read from memory component 106 and/or storage component 108. Encryption/decryption component 602 can also facilitate the generation of digital signatures associated with a user(s) and/or data. Encryption/decryption component 602 can provide symmetric cryptographic tools and accelerators (e.g., Twofish, Blowfish, AES, TDES, IDEA, CAST5, RC4, etc.) to facilitate securing data. Encryption/decryption component 602 can also provide asymmetric cryptographic accelerators and tools (e.g., RSA, Digital Signature Standard (DSS), and the like) to facilitate data security. Additionally, encryption/decryption component 602 can provide accelerators and tools (e.g., Secure Hash Algorithm (SHA) and its variants such as, for example, SHA-0, SHA-1, SHA-224, SHA-256, SHA-384, and SHA-512) to facilitate data security.

Additionally and/or alternatively encryption/decryption component 602 can further include an authentication aspect that can solicit authentication data from an entity (e.g., a user), and, as a function of the solicited authentication data, that can be employed, individually and/or in conjunction with information acquired and ascertained as a result of biometric modalities employed, to facilitate controlling access to the memory component 106 and/or storage component 108. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PM) data can also be employed by the discussed authentication aspects. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

Encryption/decryption component 602 can encrypt and/or decrypt media content contemporaneously with, and/or on, receipt of the media content from content server/content service. Additionally and/or alternatively, encryption/decryption component 602 can provide facilities for encryption/decryption when media content is played back using the facilities provided by a playback component (e.g., playback component 702 discussed infra).

Figure 7:
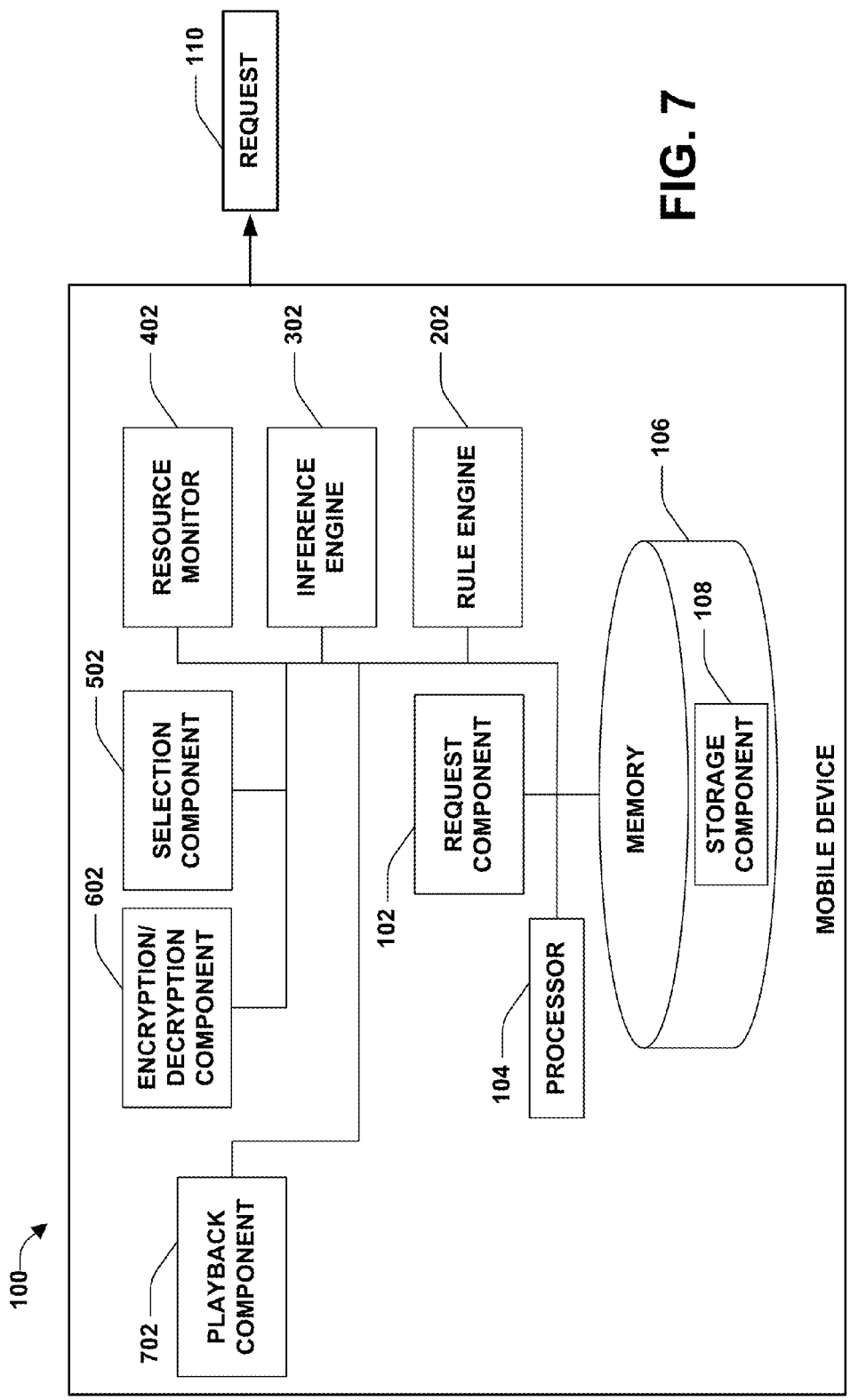
FIG. 7 illustrates an example non-limiting system that transmits a request to a content server/content service soliciting media content server/content service to respond with one or more media content previously persisted in databases associated with the content server/content service in accordance with various aspects and implementations described herein.

FIG. 7 provides yet a further non-limiting illustration of system 100 that transmits a request 110 to a content server/content service soliciting the media content server/content service to respond with one or more media content previously persisted in databases associated with the content server/content service. As depicted, system 100 can include playback component 702. Playback component 702 can facilitate playback of media content that has been downloaded and/or persisted to memory unit 106 and/or storage component 108. Playback component 702 can include a play aspect that allows a user to play the downloaded media content, or portions of the downloaded media content, a pause feature that permits the user to pause the downloaded media content during playback, a stop aspect that allows the user to stop or terminate playback of the downloaded media content if and when the media content is in playback mode, jog forward and/or jog reverse features that permit the user to advance or reverse playback of the media content at least one frame at a time, and fast forward and/or reverse aspects that afford the user the ability to forward and/or reverse playback of the media content several frames at a time. Additionally and/or alternatively, playback component 702 can include other features that can enhance the user's experience in regard to playback of media content on system 100. Such other features can include equalizers, color and/or hue enhancement capabilities, conversion capabilities between disparate media formats and/or transcoding formats, etc. Further, playback component 702 can also notify a user that a download of media content from a content service/content server to system 100 is, in progress (e.g., depicting progress of the download using a metering aspect and/or a dial aspect), complete, and/or is ready for playback.

Figure 8:
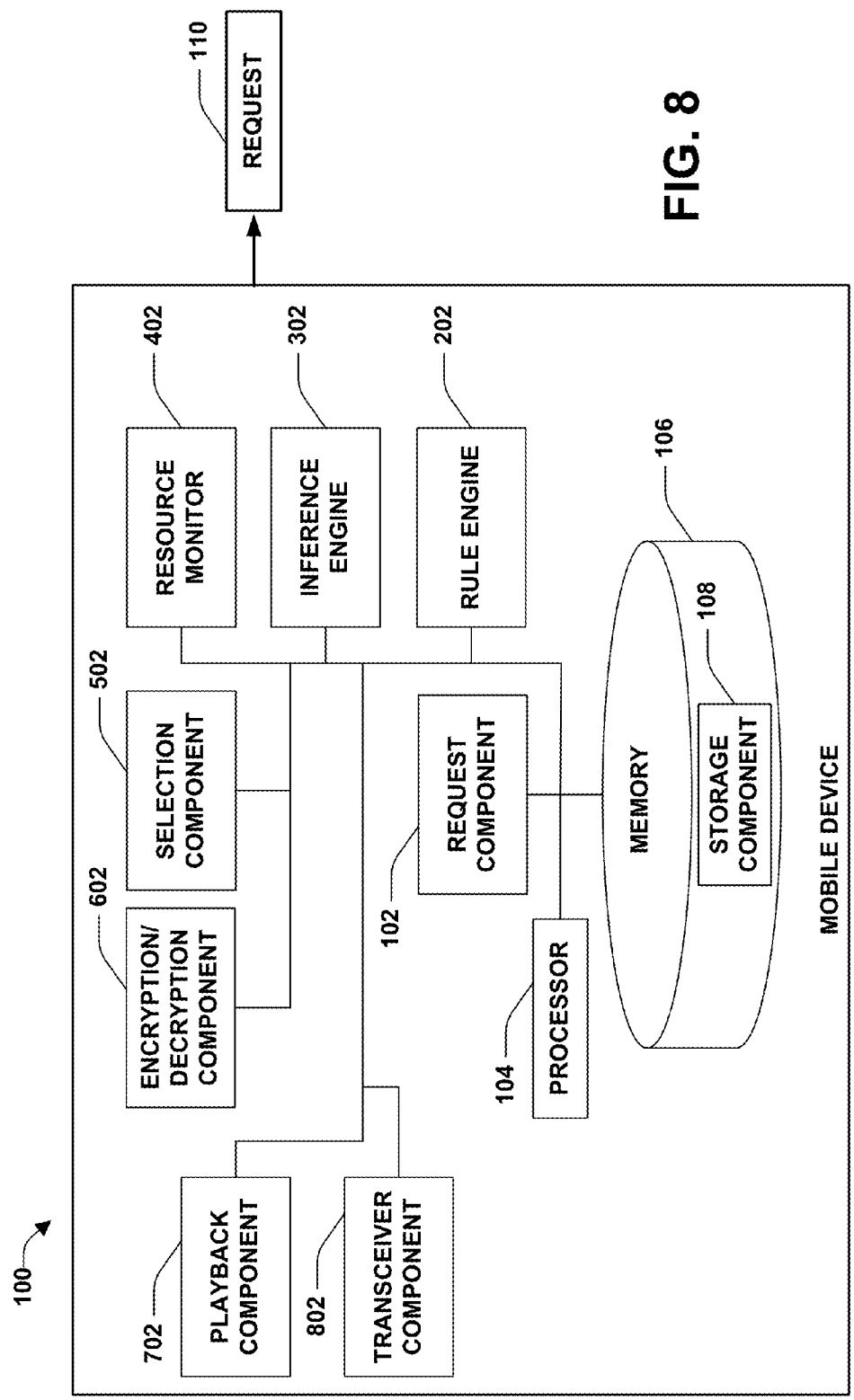
FIG. 8 illustrates an example non-limiting system that transmits a request to a content server/content service soliciting media content server/content service to respond with one or more media content previously persisted in databases associated with the content server/content service in accordance with various aspects and implementations described herein.

FIG. 8 provides another non-limiting illustration of system 100 that transmits a request 110 to a content server/content service soliciting the media content server/content service to respond with one or more media content previously persisted in databases associated with the content server/content service. As illustrated, system 100 can include a transceiver component 802. As will be appreciated by those of ordinary skill in the art, transceiver component 802 can comprise a transmission side and a receiver side. The receiver side can include a receiver that receives signals, through a plurality of receive antennas included in a receive antenna array, from one or more content service/content server, for example. The receiver can receive information from the receive antenna array and is operatively associated with a demodulator that demodulates the received information. Demodulated symbols can be analyzed by processor 104 that can be a processor dedicated to analyzing information received by the receiver and/or generating information for transmission by a transmitter, a processor that controls one or more components of mobile device or system 100, and/or a processor that both analyzes information received by the receiver, generates information for transmission by a transmitter, and controls one or more components of mobile device or system 100 and which is coupled to a memory 106 that stores data to be transmitted to and/or received from content service/content server, and/or any other suitable information related to performing the various actions and functions set forth herein.

The transmission side of transceiver 802, as will be appreciated by those of ordinary skill, can include a transmitter that transmits to one or more content server/content service through a transmit antenna array. Typically, the transmitter is coupled to a modulator that can multiplex frames for transmission by the transmitter via the transmit antenna array to the content service/content server.

Figure 9:
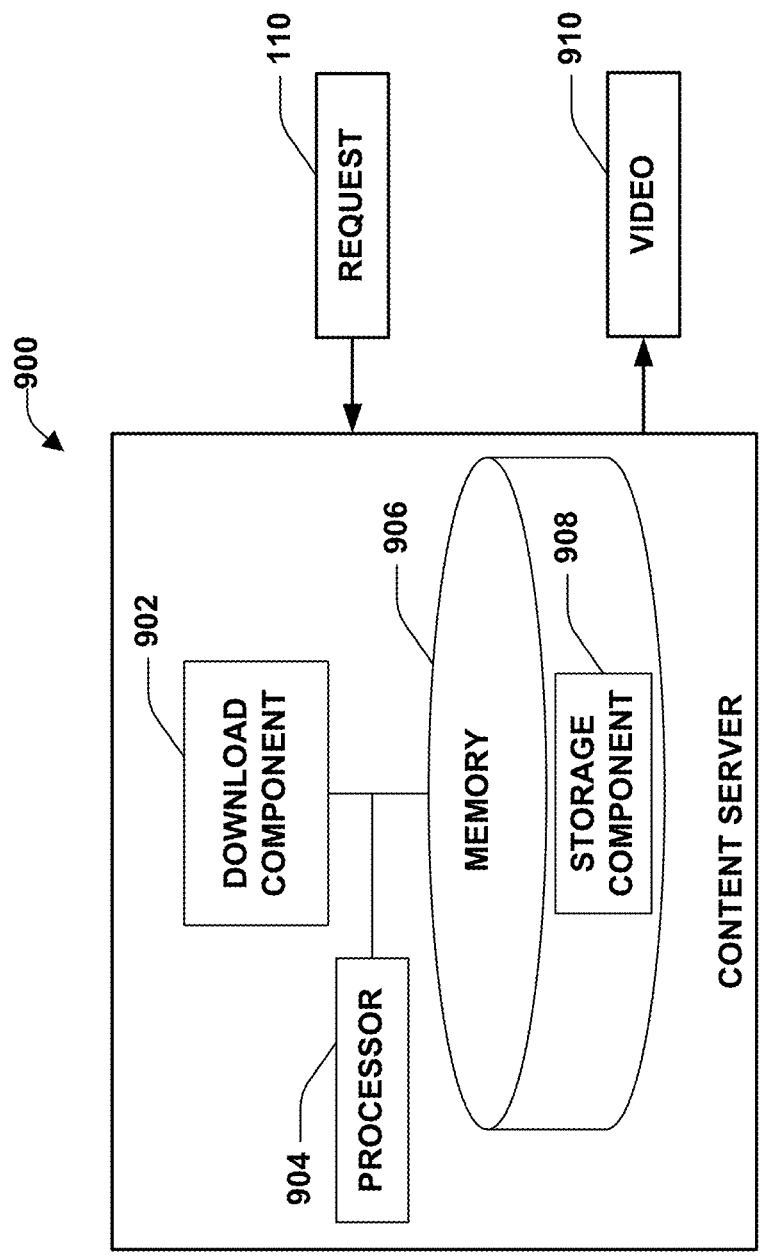
FIG. 9 illustrates an example non-limiting content server that can receive a request dispatched, over a wired and/or wireless cellular network, by a mobile device in accordance with various aspects and implementations described herein.

Turning now to FIG. 9 that provides a non-limiting depiction of a content server 900 on which a content service can be operational. In accordance with an aspect, content server 900 and/or the content service associated with content server 900 can receive a request (e.g., request 110) that has been dispatched, over a wired and/or wireless cellular network, by a mobile device (e.g., system 100). As noted above, request 110 can include a demand that particular media content (e.g., video 910) be sent to the mobile device (e.g., system 100) in response to receipt of the request 110, as well as rules regarding how content server 900 should dispatch or transmit the media content back to system 100. Typically, the rules included in request 110 can relate to the appropriate times during which content server 900 should transmit media content in fulfillment of the request 110. Generally, times during which it is appropriate to convey media content back to system 100 can be ascertained as a function of a subscriber plan that a user of system 100 may have negotiated with their cellular provider, the capacity and/or processing constraints associated with the wired and/or wireless cellular network, capacity and processing limitations associated with both content server 900 and/or mobile device or system 100, memory and/or storage restraints associated with system 100 and/or content server 900, and other impediments that can exist with regard to communication of media content (e.g., video 910) from content server 900 to system 100.

As illustrated content server 900 can include download component 902 that can operate in combination with processor 904, memory 906, and storage component 908 to return media content, here illustrated as video 910, to a mobile device (e.g., system 100) in response to having received request 110. Download component 902 can parse the request 110 received from a mobile device (e.g., system 100) to ascertain the media content that has been requested together with the rules (if any) included in request 110. The rules included in request 110 can pertain to times at which dispatch of media content is: consonant with a data plan under which the mobile device (e.g., system 100) operates; congruent with traffic flow patterns that can have been, or will be, established by a wired and/or wireless cellular network provider (e.g., off peak hours, etc.), and concordant with processing, capacity, and power resource utilization limitations associated with the mobile device that communicated request 110.

As a function of the received rules (e.g., extracted from request 110) and/or any other restrictions under which the media content may need to be returned to a mobile device, download component 902 can dynamically ascertain an appropriate time period during which to convey the requested media content to the requesting mobile device (e.g., system 100). Additionally and/or alternatively, download component 902 can select an appropriate broadcast medium and broadcast service to employ over which the requested media content can be returned to the requesting mobile device.

Since conditions under which a mobile device (e.g., system 100) operates can change with rapidity and/or without notice (e.g., connectivity with the cellular network can be temporarily lost, power resources associated with the mobile device can become depleted, processor capabilities can become overextended, memories and disk capacities overloaded, etc.) the mobile device can continuously, periodically, and/or at random intervals, send update messages to content server 900 informing content server 900 of any changes regarding these conditions. These update messages can be employed by download component 902 to modify the conditions that can have been set or specified in previously received rules under which transmission of the requested media content is taking place. For instance, if a mobile device reports (e.g., subsequent to content server 900 having received an earlier, or initial, set of rules from a mobile device) that its processors are currently operating at full capacity, download component 902 can initiate procedures to ensure that subsequent transmissions of the requested media content are put or placed into abeyance for a random quantum of time, whereupon during the effluxion, or at the expiration, of the abeyance period, download component 902 can attempt to reestablish transmission of the requested media content.

Figure 10:
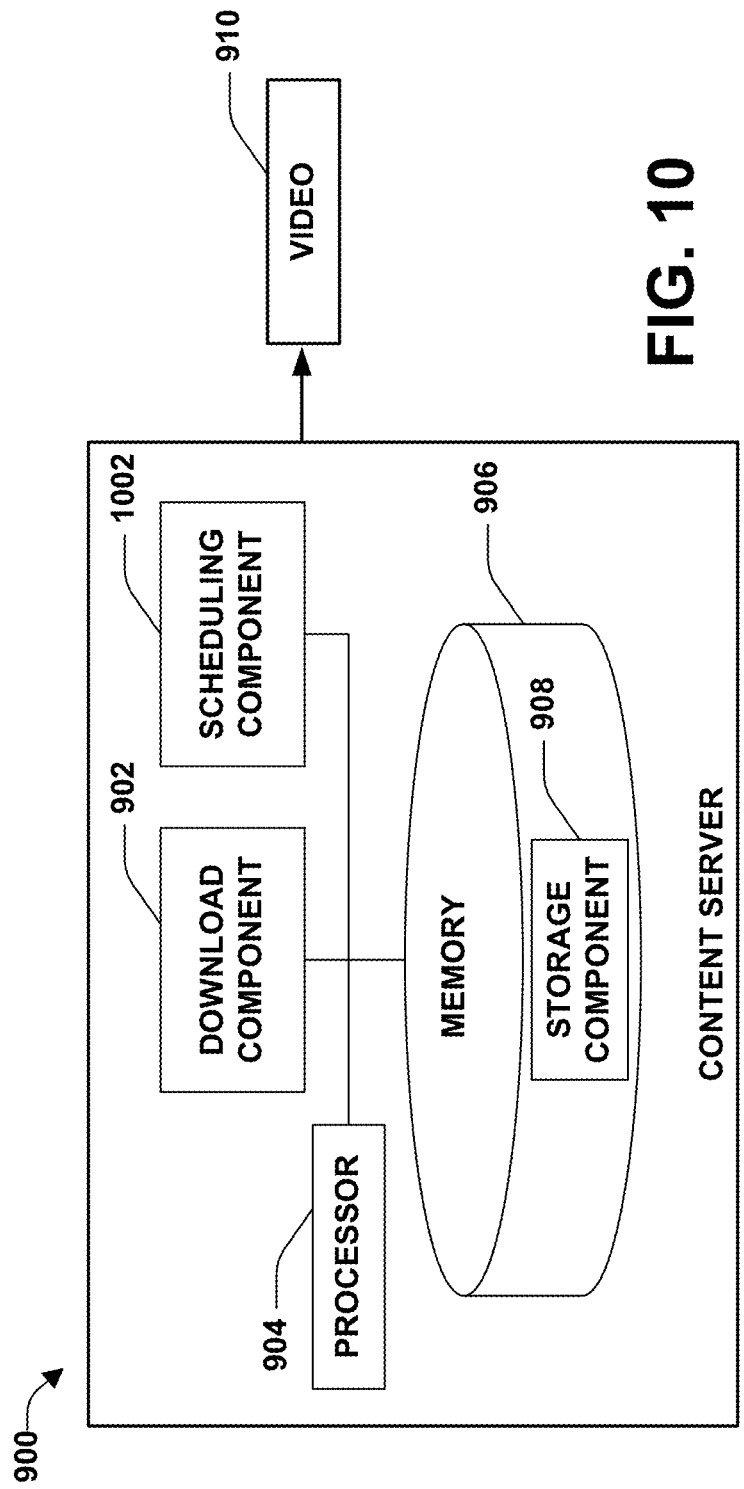
FIG. 10 a further non-limiting illustration of a content server that includes scheduling component that can employ a rule included in a request received from a mobile device to schedule transmissions of requested media content to a requesting mobile device in accordance with various aspects and implementations described herein.

FIG. 10 provides a further non-limiting illustration of a content server 900. In accordance with a further aspect, content server 900, in addition to download component 902, can include scheduling component 1002 that can employ the rules included in the request received from a mobile device to schedule transmissions of requested media content to the requesting mobile device. Scheduling component 1002 can identify and/or select a broadcast medium and/or service to utilize to transmit and return the requested media content to the requesting mobile device. Further, in conjunction with a clock aspect (not shown) scheduling component 1002 can ensure that transmissions over the selected broadcast medium and/or service conforms to any time limitations/requirements and/or other conditions set forth that may have been included in the rule received in the request from the mobile device.

Figure 11:
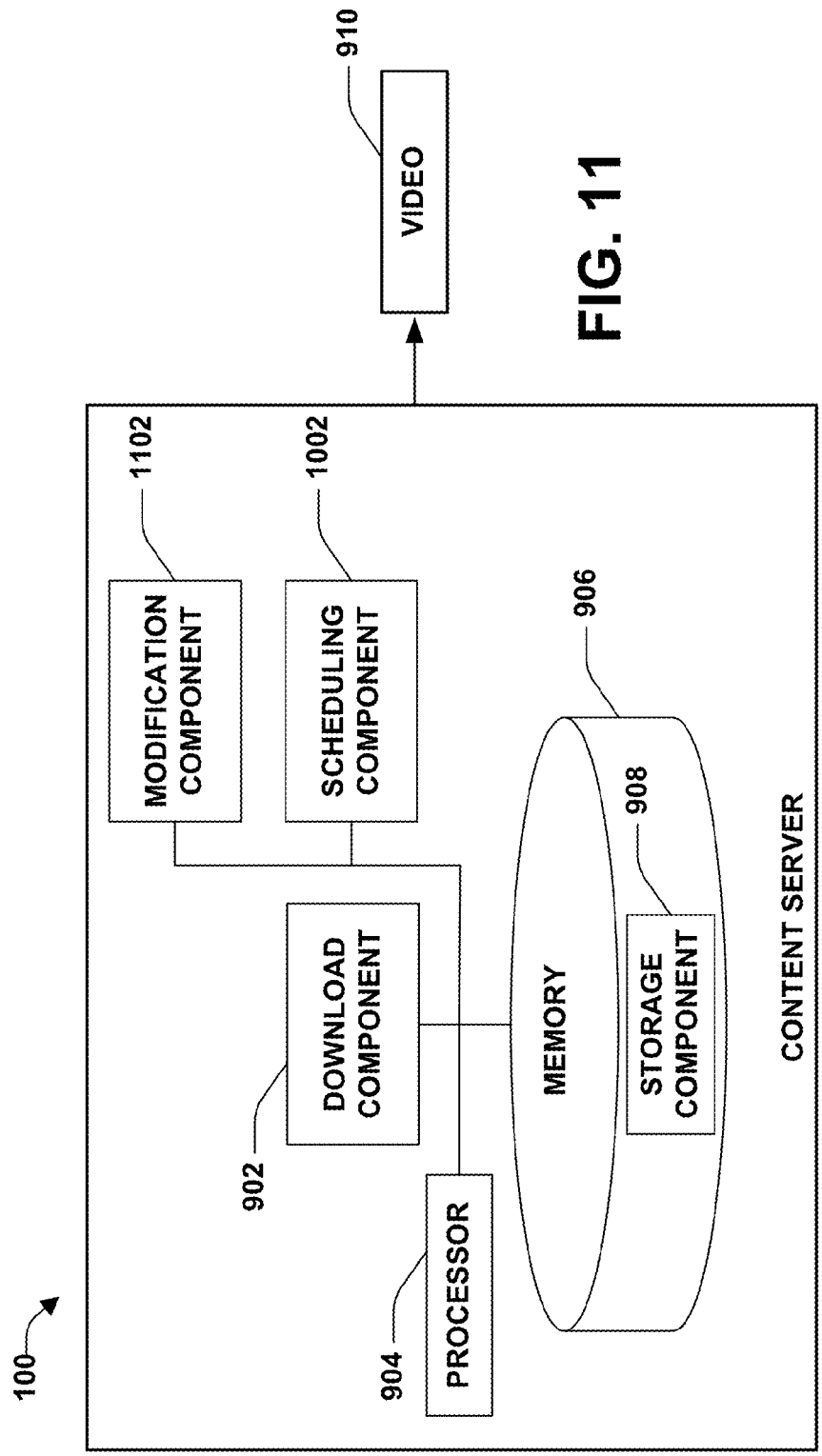
FIG. 11 provides a yet another non-limiting depiction of a content server that can include a modification component that can modify transmission parameters employed in returning a requested media content to a requesting mobile device in accordance with various aspects and implementations described herein.

FIG. 11 provides yet another non-limiting depiction of a content server 900. In accordance with this further aspect, content server 900 can include modification component 1102 that can modify transmission parameters employed in returning the requested media content (e.g., video 910) to the requesting mobile device and that can have been specified in an earlier request received by content server 900 from a mobile device (e.g., system 100). Adjustment of the transmission parameters or characteristics used in returning the requested media content can be based on updated conditions reported by the mobile device to content server 900 subsequent to reception of the rules included in an earlier request for media content (e.g., request 110).

Modification component 1102 in accordance with the foregoing and in response to receipt of an update report received from a mobile device can cause transmission of media content to mobile device in fulfillment of an earlier received request 110 to be placed into abeyance for a duration of time. The duration of time during which transmission of media content is placed on hold or in abeyance can be for: an arbitrary period ascertained by modification component 1102; for a period until a further update is received from the mobile device informing content server 900 that an earlier noted and notified bottleneck has been resolved; and/or for a period that is mutually agreed between the content server 900 and mobile device (e.g., system 100). As will be appreciated by those of ordinary skill, the mutually agreed backoff period can be conveyed between the content server 900 and mobile device (e.g., system 100) in a sequence of packets communicated between content server 900 and mobile device (e.g., system 100).

Figure 12:
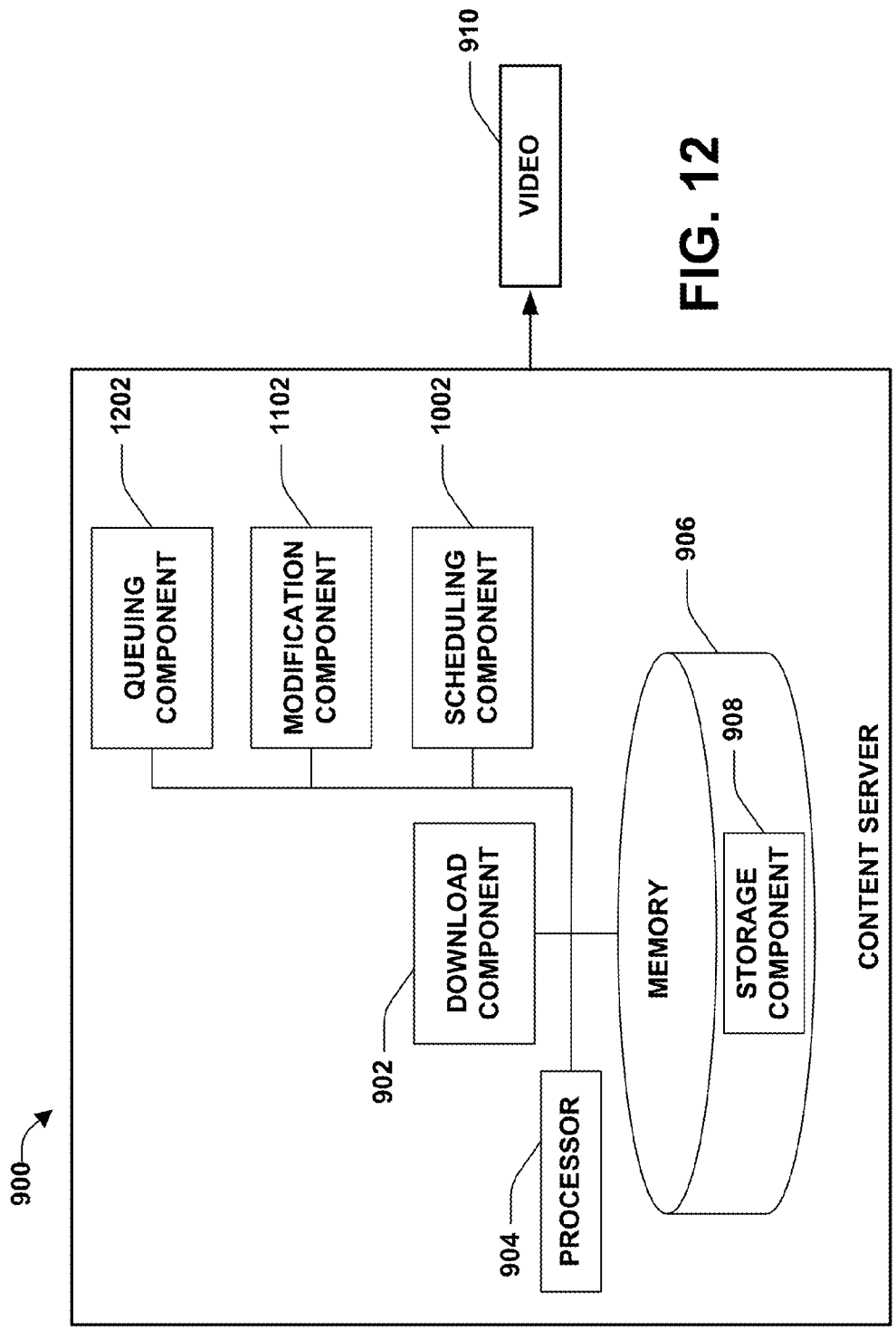
FIG. 12 provides another non-limiting depiction of a content server that can include a queuing component that can be utilized when a mobile device includes a request for more than one media content in request, or when the mobile device sends multiple requests for disparate media content in a finite duration of time in accordance with various aspects and implementations described herein.

FIG. 12 provides another non-limiting depiction of a content server 900. In accordance with this additional aspect, content server 900 can include queuing component 1202 that can be utilized when a mobile device includes a request for more than one media content in request 110, or when the mobile device sends multiple requests for disparate media content over a period of time but the mobile device, due to resource constraints (e.g., cellular network limitations, etc.), for instance, is capable of receiving a one media content at a time. Queuing component 1202 is also capable of notifying the mobile device (and therefore a user of the mobile device) that requested media content has already been placed in a transmission queue for impending transmission to the mobile device.

It should be noted in the context of the above described queuing component 1202, while not depicted in FIGS. 1-8 illustrating aspects that can be included with or associated with system 100, a queuing aspect can also be included with system 100 wherein such a queuing aspect can be utilized (e.g., through a web browser implemented using a prototype-based scripting language application programming interface) to queue video or media content requests for subsequent dispatch to and fulfillment by a content server/service. This queuing aspect as implemented on system 100 can be useful when communication between system 100 and a content server/service has been disrupted and/or is subject to disruption. The queuing aspect as implemented on system 100 can allow users to select a plurality of media content for download from the content server/service and subsequent playback on system 100.

Figure 13:
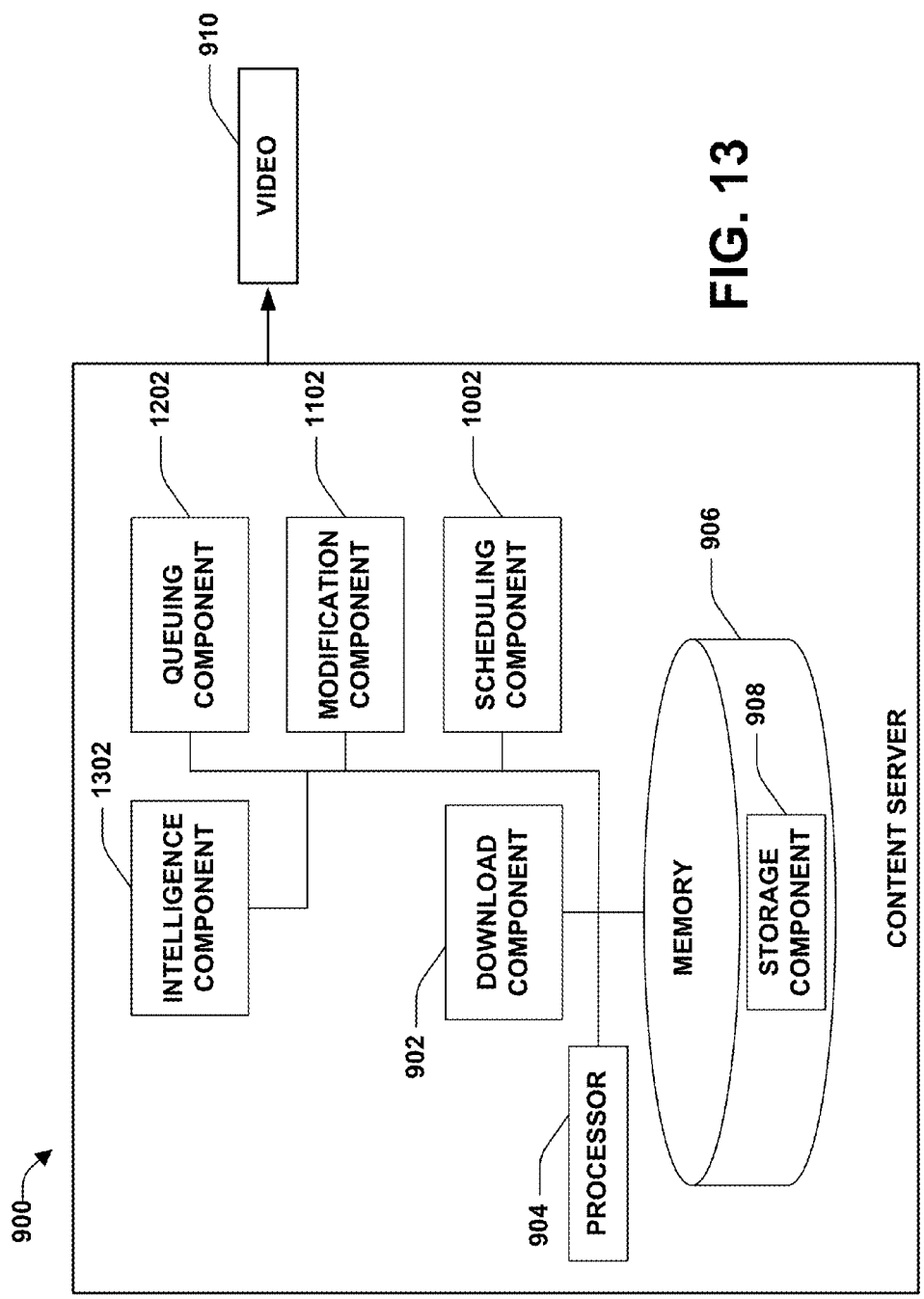
FIG. 13 provides an additional non-limiting depiction of a content server 900 that includes an intelligence component utilized to schedule transmission of media content to a requesting mobile device in accordance with various aspects and implementations described herein.

FIG. 13 provides an additional non-limiting depiction of a content server 900. In accordance with this further aspect, content server 900 can include intelligence component 1302 that can be utilized by download component 902, scheduling component 1002, and/or modification component 1102, for example, to schedule transmission of media content to a requesting mobile device. Intelligence component 1302 can utilized to provide inferences regarding putative conditions that might occur in the future based on, or as a function of, past results. Further, intelligence component 1302 can infer prototypical attributes about the ambient wired and/or wireless cellular network and/or factors associated with the processing and transmission capabilities of content server 900.

Intelligence component 1302 can be utilized, for example, to dynamically determine one or more of threshold or set points associated with the ambient wired and/or wireless cellular network as well as thresholds and set points associated with the processing capacity and/or power requirements needed by content server 900. Intelligence component 1302 can employ a probabilistic based and/or statistical based approach, for example, in connection with making determinations or inferences. Inferences can be based in part upon explicit training of classifiers (not shown) before employing content server 900, or implicit training based at least in part upon system feedback and/or users previous actions, commands, instructions, and the like during use of the system. Intelligence component 1302 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. Intelligence component 1302 can factor historical data, extrinsic data, context, data content, state of the user, and can compute a cost of making an incorrect determination or inference versus a benefit of making a correct determination or inference. Accordingly, a utility-based analysis can be employed with providing such information to other components or taking automated action. Ranking and confidence measures can also be calculated and employed in connection with such analysis.

Additionally and/or alternatively, intelligence component 1302 can employ one or more collaborative filtering techniques that can be based at least in part on model mobile devices and the cellular network to which they can be coupled to aid in scheduling and/or modifying transmission characteristics, etc.

Figure 14:
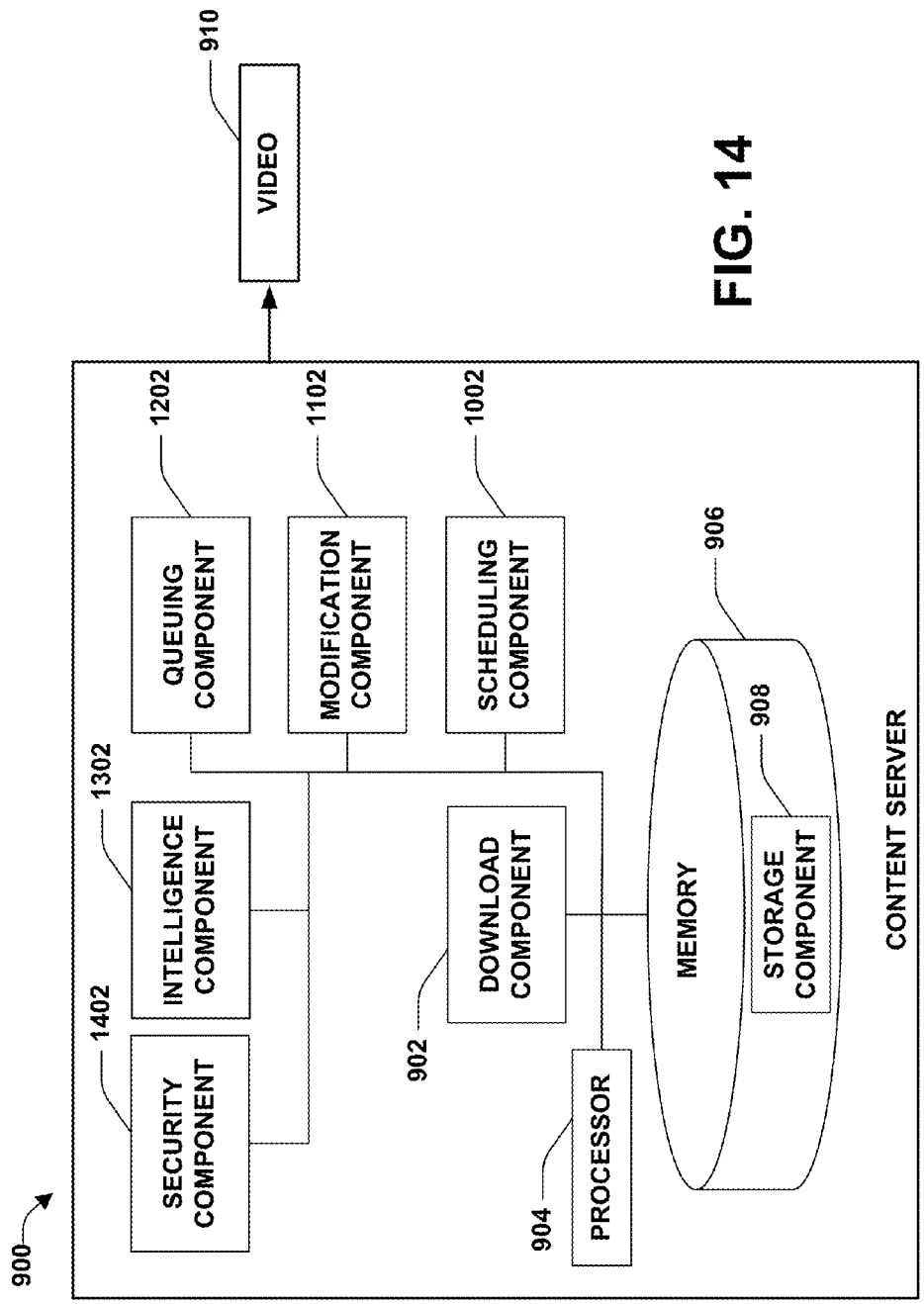
FIG. 14 provides a further non-limiting depiction of a content server that includes a security component in accordance with various aspects and implementations described herein.

FIG. 14 provides a further non-limiting depiction of a content server 900. In accordance with this additional aspect, content server 900 can include security component 1402 that can operate in a manner similar to that enunciated with regard to encryption/decryption component 602. Security component 1402 can therefore facilitate the encryption of media content being written to memory 906 and/or storage component 908 and/or decryption of data being read from memory component 906 and/or storage component 908. Security component 1402 can also facilitate the generation of digital signatures associated with a user(s) and/or data. Security component 1402 can provide symmetric cryptographic tools and accelerators (e.g., Twofish, Blowfish, AES, TDES, IDEA, CAST5, RC4, etc.) to facilitate securing data. Security component 1402 can also provide asymmetric cryptographic accelerators and tools (e.g., RSA, Digital Signature Standard (DSS), and the like) to facilitate data security. Additionally, security component 1402 can provide accelerators and tools (e.g., Secure Hash Algorithm (SHA) and its variants such as, for example, SHA-0, SHA-1, SHA-224, SHA-256, SHA-384, and SHA-512) to facilitate data security.

Additionally and/or alternatively security component 1402 can further include an authentication aspect that can solicit authentication data from an entity (e.g., a user), and, as a function of the solicited authentication data, can be employed, individually and/or in conjunction with information acquired and ascertained as a result of biometric modalities employed, to facilitate controlling access to the memory component 906 and/or storage component 908. The authentication data can be in the form of a password (e.g., a sequence of humanly cognizable characters), a pass phrase (e.g., a sequence of alphanumeric characters that can be similar to a typical password but is conventionally of greater length and/or contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication aspects. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

Security component 1402 can encrypt and/or decrypt media content contemporaneously with dispatch of the media content to a requesting mobile device. Additionally and/or alternatively, security component 1402 can provide facilities for encryption/decryption when media content is retrieved from and/or persisted to memory 906 and/or storage component 908.

Figure 15:
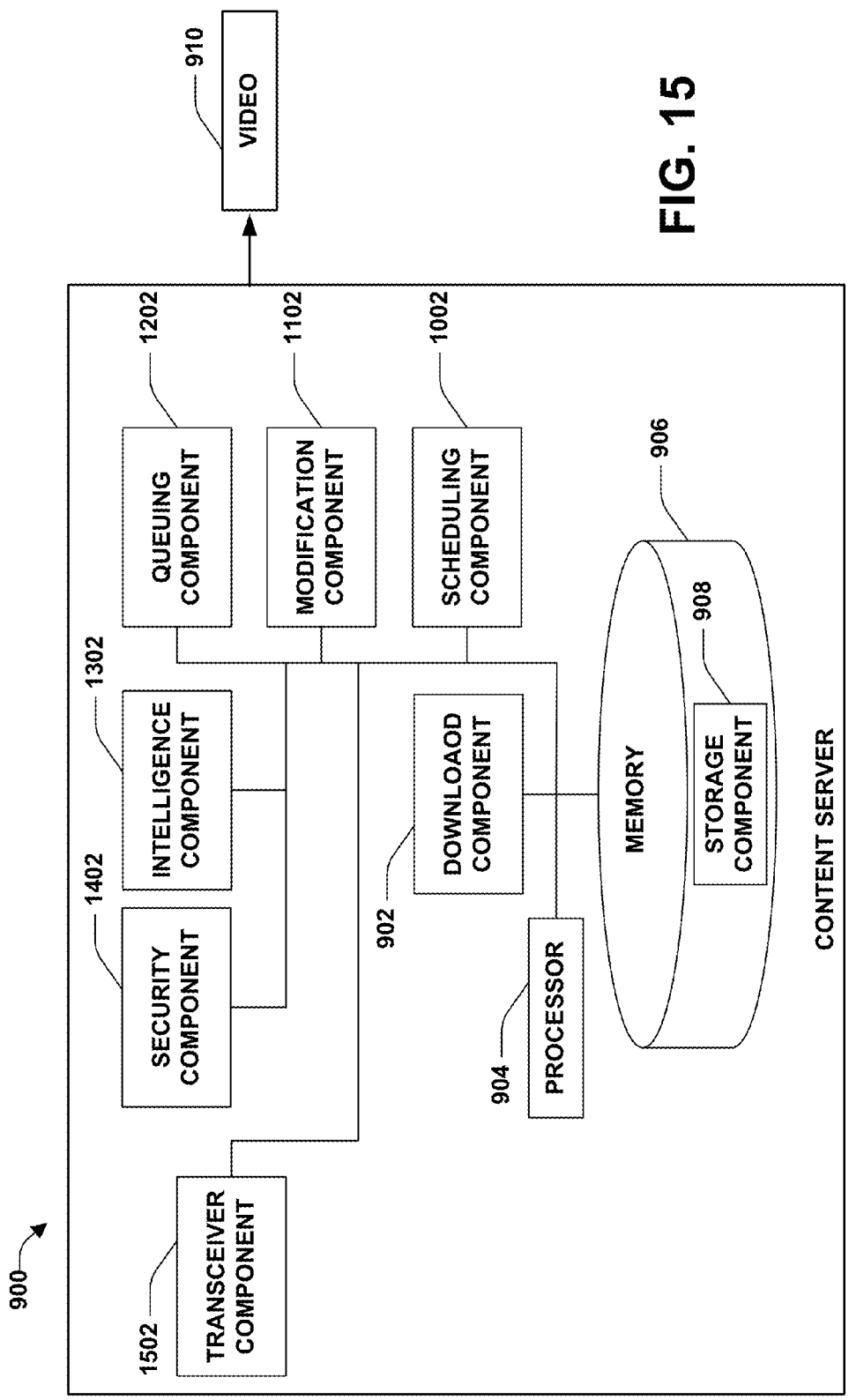
FIG. 15 provides still yet another non-limiting depiction of a content server that can include a transceiver component in accordance with various aspects and implementations described herein.

FIG. 15 provides still yet another non-limiting depiction of a content server 900. In accordance with this aspect, content server 900 can include transceiver component 1502 that can receive and transmit signals through receive and transmit antenna arrays from and to one or more mobile devices (e.g., system 100). As will be appreciated by those of ordinary skill, transceiver component 1502 can include a receiver aspect and a transmitter aspect. The receiver aspect can receive information from receive and transmit antenna arrays and is operatively associated with a demodulator that demodulates received information. Demodulated symbols are analyzed by a processor 904 that can be a processor dedicated to analyzing information received by the receiver aspect, and/or generating information for transmission by the transmission aspect, a processor that controls one or more components of content server 900, and/or a processor that both analyzes information received by the receiving aspect, generates information for transmission by the transmitting aspect, and controls one or more components of the content server 900, and which is coupled to a memory 906 that stores data to be transmitted to and/or received from one or mobile devices.

In regard to the transmitter aspect of transceiver component 1502, the transmitter aspect can be communicatively coupled to a modulator that can multiplex frames for transmission by the transmitter aspect through the receive and transmit antenna arrays to one or more mobile devices.

Figure 16:
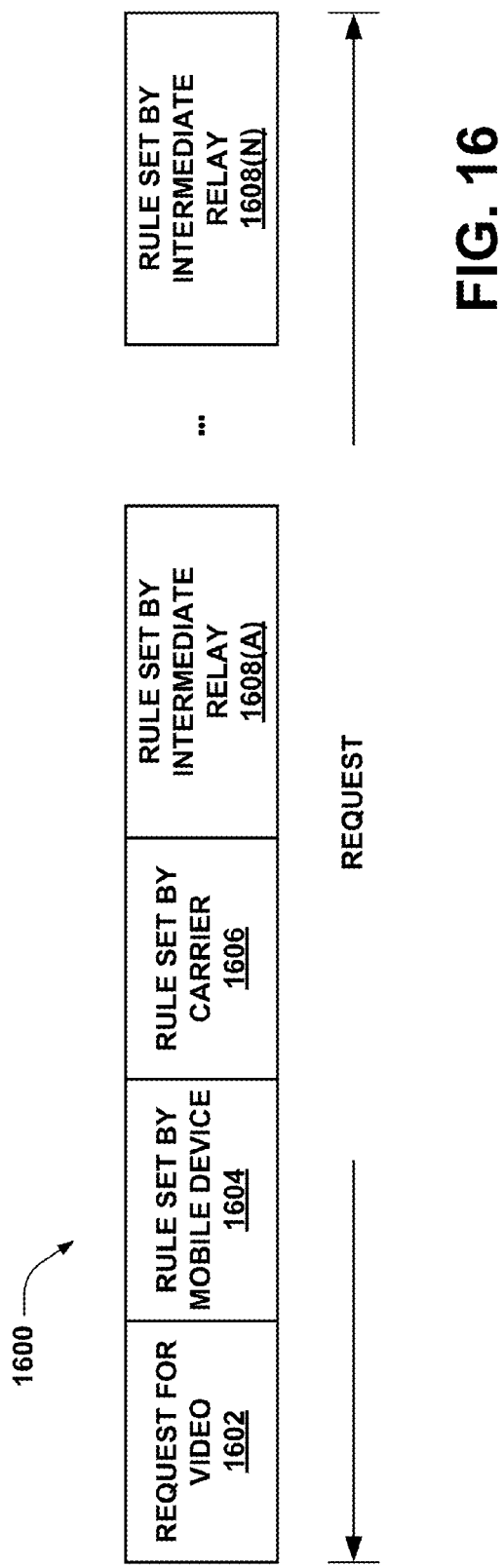
FIG. 16 provides a non-limiting depiction of an illustrative request packet that can have been forwarded from a mobile device to a content server in accordance with various aspects and implementations described herein.

FIG. 16 provides a non-limiting depiction of an illustrative request packet 1600 that can have been forwarded from a mobile device to a content server. As illustrated request packet 1600 can include a request for media content (e.g., request for video 1602) and rules set by the mobile device 1604 that should be adhered to by the content server in returning the requested media content to the mobile device. Additionally and/or alternatively, the request packet as received at a content server, for instance, can also include rules that can have been set by the cellular carrier 1606, as well as other rules can have been set by intermediate nodes through which request packet 1600 can have traversed (e.g., rules set by intermediate relay 1608(A)—rules set by intermediate relay 1608(N), where A and N denote integers greater than or equal to one). These rules set by the carrier and/or intermediary nodes or intermediate relays can provide additional information to the content sever for the transmission of media content back to a requesting mobile device. For instance, rules set by the carrier and/or the intermediate nodes can inform the content server to preferably route the returned media content through alternate intermediate nodes rather than those that were employed in transmitting request packet 1600 to the content server.

In the context of the inference engine and/or the intelligence component discussed above, these components in order to facilitate their respective aims, can examine the entirety or a subset of data to which it is granted access and can provide for reasoning about or inferring relevancy to and desirability of utilizing respective factors. An inference can be probabilistic—that is, the computation of a probability distribution over states of interest based on a consideration of data and events. An inference can also refer to techniques employed for composing higher-level events from a set of events or data.

Such inference can result in construction of new events or actions from a set of observed events or stored event data, whether or not the events are correlated in close temporal proximity, and whether the events and data come from one or several event and data sources. Various classifications (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 17:
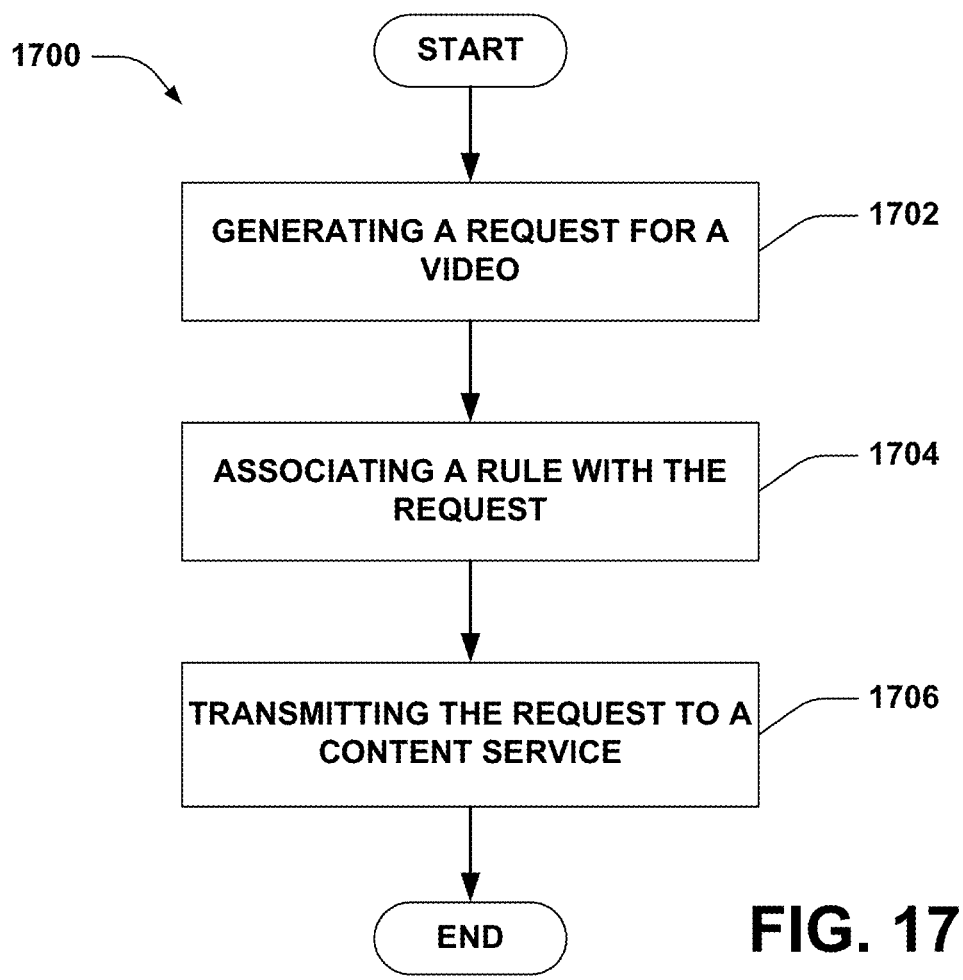
FIG. 17 illustrates an example methodology for pre-fetching video content from a content server or service for playback on a mobile device in accordance with various aspects and implementations described herein.
Figure 18:
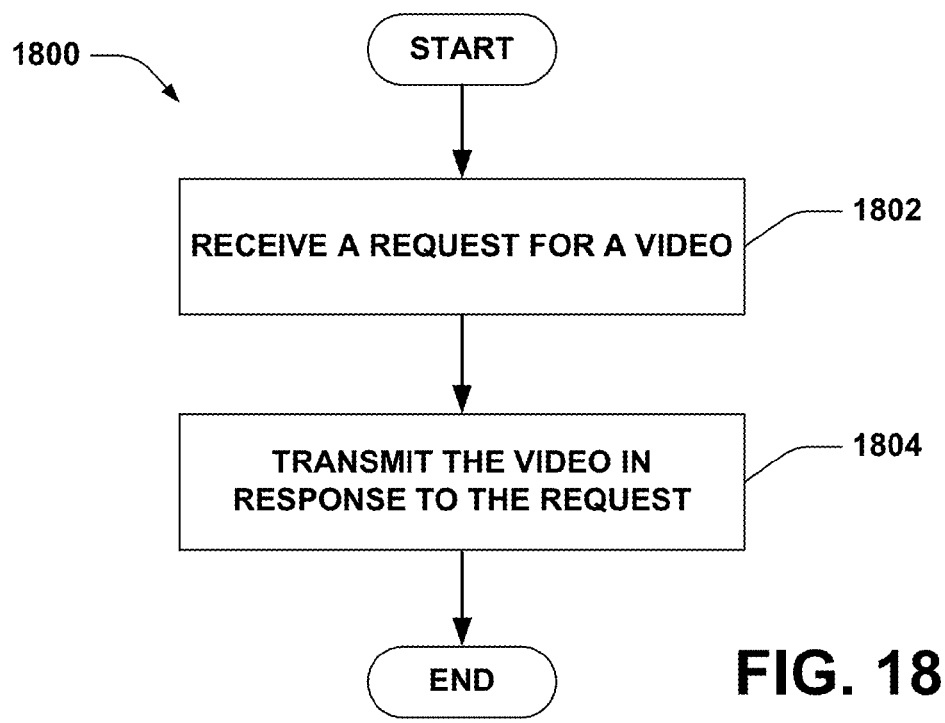
FIG. 18 illustrates another example methodology for pre-fetching video content from a content server or service for playback on a mobile device in accordance with various aspects and implementations described herein.

FIGS. 17-18 illustrate methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of inter-related states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 17 presented is a flow diagram of an example application of systems disclosed in this description in accordance with an aspect. In an aspect, exemplary methodology 1700 of a system for pre-fetching video content from a content server or service for playback on a mobile device is stored in a memory and utilizes a processor to execute computer executable instructions to perform functions. At 1702 a request for a video or media content of interest to a user of a mobile device can be generated (e.g., using request component 102). At 1704 a rule that can be utilized by a content server in fulfillment of the request can be associated with the request for the video or media content of interest (e.g., using rule component 202). At 1706 the request for the video or media of interest together with the rule that can govern how a content server should return the video or media content of interest can be transmitted to the content server (e.g., using transceiver component 802).

Referring now to FIG. 18 presented is a flow diagram of another example application of systems disclosed in this description accordance with an aspect. In an aspect, exemplary methodology 1800 of a system for pre-fetching video content from a content server for playback on a mobile device is stored in a memory and utilizes a processor to execute computer executable instructions to perform functions. At 1802 a request for media content of interest to a user of a mobile device can be received by a content server, wherein the request can include at least one rule pertaining to the mobile device and/or transmission preferences associated with the transmission of the requested media content back to the requesting mobile device (e.g., using transceiver component 1502 and/or download component 902). At 1804 the requested media content of interest to the user of the mobile device is transmitted back to the mobile device that generated and dispatched the request for media content (e.g., using transceiver 1502, scheduling component 1002, and modification component 1102).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various aspects described in this disclosure, it is to be understood that other similar aspects can be used or modifications and additions can be made to the described aspect(s) for performing the same or equivalent function of the corresponding aspect(s) without deviating there from. Still further, multiple processing chips or multiple devices can share the performance of one or more functions described in this disclosure, and similarly, storage can be effected across a plurality of devices. Accordingly, the invention is not to be limited to any single aspect, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 19:
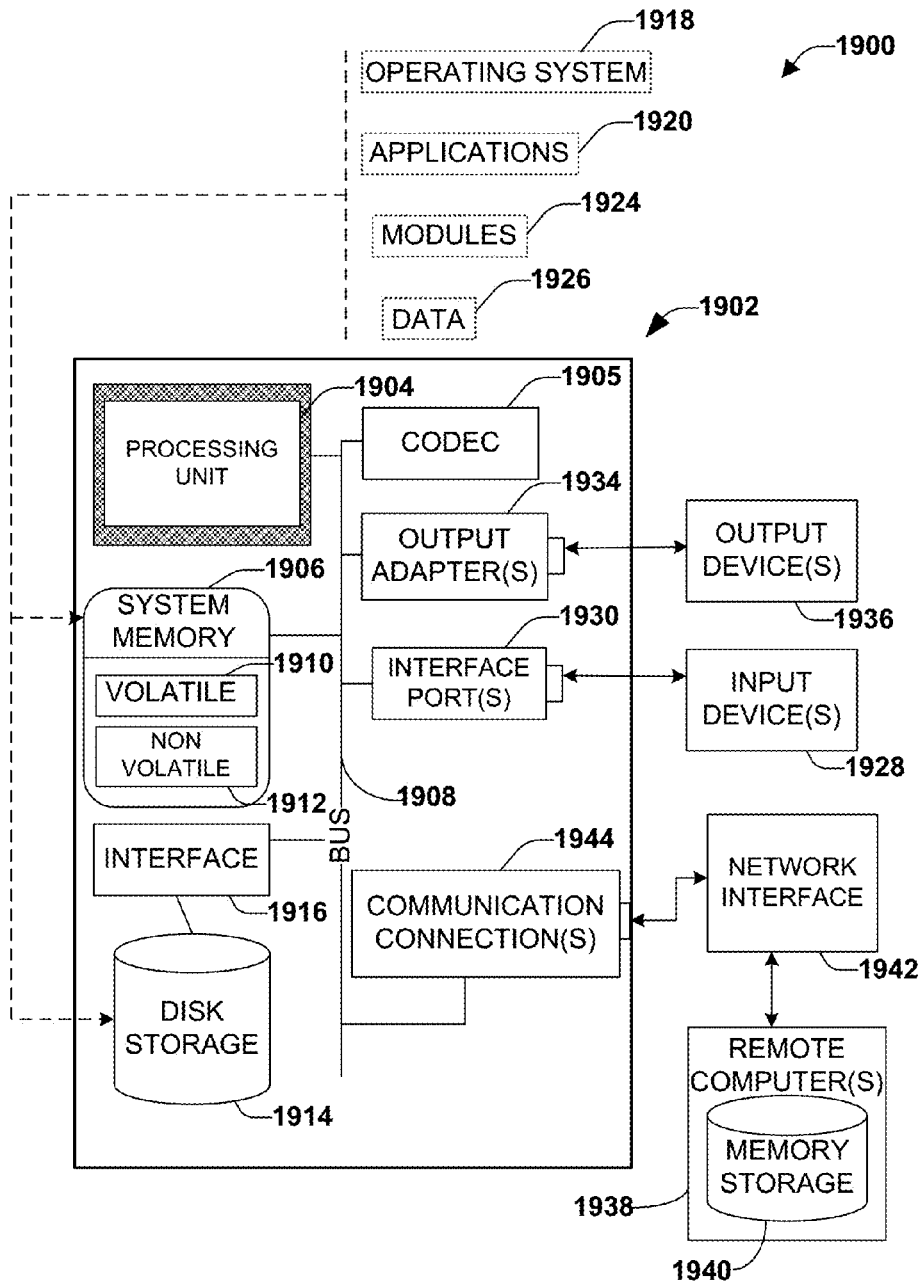
FIG. 19 is a block diagram representing an exemplary non-limiting networked environment in which various aspects can be implemented.

With reference to FIG. 19, a suitable environment 1900 for implementing various aspects of the claimed subject matter includes a computer 1902. The computer 1902 includes a processing unit 1904, a system memory 1906, a codec 1905, and a system bus 1908. In an aspect, processing unit 1904 and system memory 1906 can represent processor 104, and memory 106 respectively. The system bus 1908 couples system components including, but not limited to, the system memory 1906 to the processing unit 1904. The processing unit 1904 can be any of various available processors. Dual microprocessors and other multiprocessor architectures also can be employed as the processing unit 1904.

The system bus 1908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13184), and Small Computer Systems Interface (SCSI).

The system memory 1906 includes volatile memory 1910 and non-volatile memory 1912. The basic input/output system (BIOS), containing the basic routines to transfer information between elements within the computer 1902, such as during start-up, is stored in non-volatile memory 1912. In addition, according to present innovations, codec 1905 may include at least one of an encoder or decoder, wherein the at least one of an encoder or decoder may consist of hardware, a combination of hardware and software, or software. Although, codec 1905 is depicted as a separate component, codec 1905 may be contained within non-volatile memory 1912. By way of illustration, and not limitation, non-volatile memory 1912 can include read only memory (ROM), programmable ROM (PROM), electrically programmable ROM (EPROM), electrically erasable programmable ROM (EEPROM), or flash memory. Volatile memory 1910 includes random access memory (RAM), which acts as external cache memory. According to present aspects, the volatile memory may store the write operation retry logic (not shown in FIG. 19) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1902 may also include removable/non-removable, volatile/non-volatile computer storage medium. FIG. 19 illustrates, for example, disk storage 1914. Disk storage 1914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1914 to the system bus 1908, a removable or non-removable interface is typically used, such as interface 1916.

It is to be appreciated that FIG. 19 describes software that acts as an intermediary between users and the basic computer resources described in the suitable operating environment 1900. Such software includes an operating system 1910. Operating system 1910, which can be stored on disk storage 1914, acts to control and allocate resources of the computer system 1902. Applications 1920 take advantage of the management of resources by operating system 718 through program modules 1924, and program data 1926, such as the boot/shutdown transaction table and the like, stored either in system memory 1906 or on disk storage 1914. It is to be appreciated that the claimed subject matter can be implemented with various operating systems or combinations of operating systems.

A user enters commands or information into the computer 1902 through input device(s) 1928. Input devices 1928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1904 through the system bus 1908 via interface port(s) 1930. Interface port(s) 1930 include, for example, a serial port, a parallel port, a game port, and a universal serial bus (USB). Output device(s) 1936 use some of the same type of ports as input device(s) 1928. Thus, for example, a USB port may be used to provide input to computer 1902, and to output information from computer 1902 to an output device 1936. Output adapter 1934 is provided to illustrate that there are some output devices 1936 like monitors, speakers, and printers, among other output devices 1936, which require special adapters. The output adapters 1934 include, by way of illustration and not limitation, video and sound cards that provide a means of connection between the output device 1936 and the system bus 1908. It should be noted that other devices and/or systems of devices provide both input and output capabilities such as remote computer(s) 1938.

Computer 1902 can operate in a networked environment using logical connections to one or more remote computers, such as remote computer(s) 1938. The remote computer(s) 1938 can be a personal computer, a server, a router, a network PC, a workstation, a microprocessor based appliance, a peer device, a smart phone, a tablet, or other network node, and typically includes many of the elements described relative to computer 1902. For purposes of brevity, only a memory storage device 1940 is illustrated with remote computer(s) 1938. Remote computer(s) 1938 is logically connected to computer 1902 through a network interface 1942 and then connected via communication connection(s) 1944. Network interface 1942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1944 refers to the hardware/software employed to connect the network interface 1942 to the bus 1908. While communication connection 1944 is shown for illustrative clarity inside computer 1902, it can also be external to computer 1902. The hardware/software necessary for connection to the network interface 1942 includes, for exemplary purposes only, internal and external technologies such as, modems including regular telephone grade modems, cable modems and DSL modems, ISDN adapters, and wired and wireless Ethernet cards, hubs, and routers.

Figure 20:
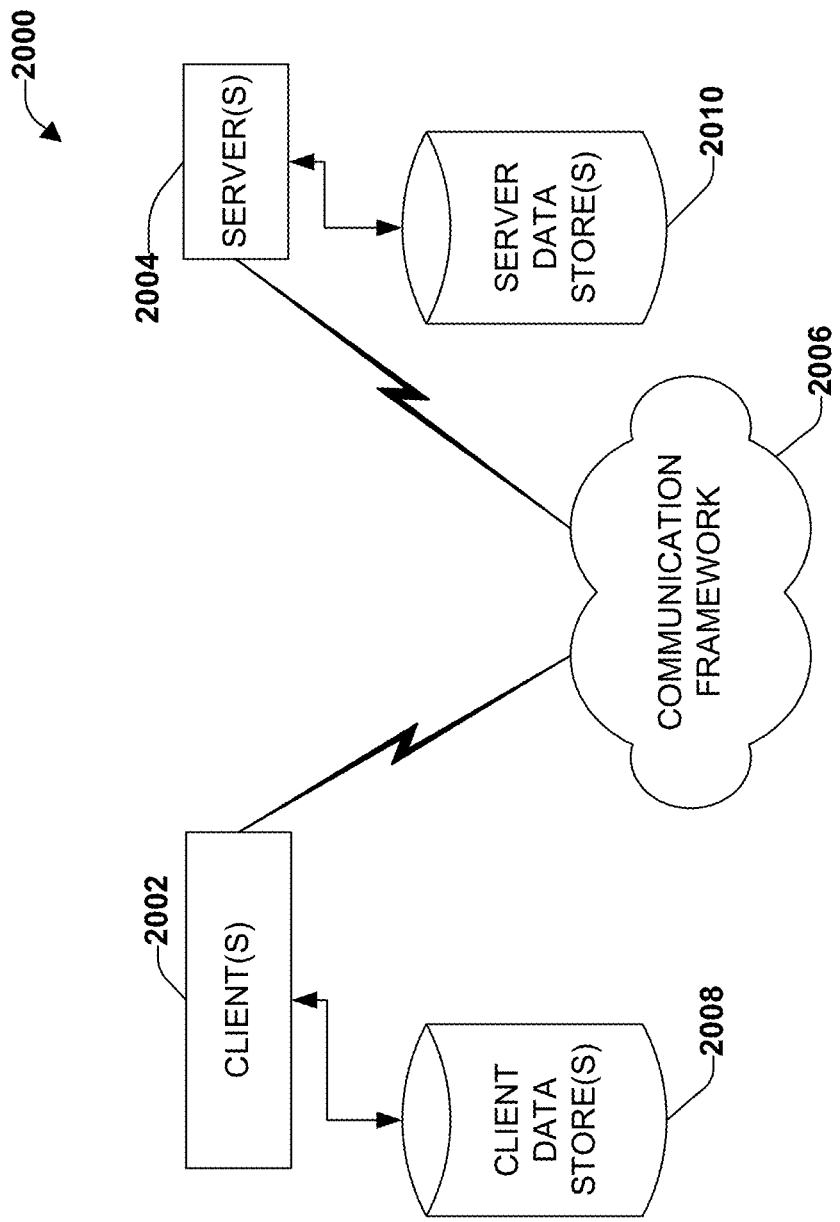
FIG. 20 is a block diagram representing an exemplary non-limiting computing system or operating environment in which various aspects may be implemented.

Referring now to FIG. 20, there is illustrated a schematic block diagram of a computing environment 2000 in accordance with this disclosure. System 2000 can for example be employed in connection with implementing one or more of the systems or components described herein and shown FIGS. 1-9. The system 2000 includes one or more client(s) 2002 (e.g., laptops, smart phones, PDAs, media players, computers, portable electronic devices, tablets, and the like). The client(s) 2002 can be hardware and/or software (e.g., threads, processes, computing devices). The system 2000 also includes one or more server(s) 2004. The server(s) 2004 can also be hardware or hardware in combination with software (e.g., threads, processes, computing devices). The servers 2004 can house threads to perform transformations by employing aspects of this disclosure, for example. One possible communication between a client 2002 and a server 2004 can be in the form of a data packet transmitted between two or more computer processes wherein the data packet may include video data. The data packet can include metadata, e.g., associated contextual information, for example. The system 2000 includes a communication framework 2006 (e.g., a global communication network such as the Internet, or mobile network(s)) that can be employed to facilitate communications between the client(s) 2002 and the server(s) 2004.

Communications can be facilitated via a wired (including optical fiber) and/or wireless technology. The client(s) 2002 include or are operatively connected to one or more client data store(s) 2008 that can be employed to store information local to the client(s) 2002 (e.g., associated contextual information). Similarly, the server(s) 2004 are operatively include or are operatively connected to one or more server data store (s) 2010 that can be employed to store information local to the servers 2004.

In one aspect, a client 2002 can transfer an encoded file, in accordance with the disclosed subject matter, to server 2004. Server 2004 can store the file, decode the file, or transmit the file to another client 2002. It is to be appreciated, that a client 2002 can also transfer uncompressed file to a server 2004 and server 2004 can compress the file in accordance with the disclosed subject matter. Likewise, server 2004 can encode video information and transmit the information via communication framework 2006 to one or more clients 2002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the aspects of the subject innovation(s). Furthermore, it can be appreciated that many of the various components can be implemented on one or more integrated circuit (IC) chips. For example, in one aspect, a set of components can be implemented in a single IC chip. In other aspects, one or more of respective components are fabricated or implemented on separate IC chips.

What has been described above includes examples of the aspects of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated aspects of the subject disclosure, including what is described in the Abstract, is not intended to be exhaustive or to limit the disclosed aspects to the precise forms disclosed. While specific aspects and examples are described in this disclosure for illustrative purposes, various modifications are possible that are considered within the scope of such aspects and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:
1. A method, comprising:
generating, by a mobile device that includes at least one microprocessor, a request for a video hosted by a content service;
predicting a broadcast condition associated with the mobile device at a future period in time based upon at least one characteristic associated with the mobile device;
associating, by the mobile device, a rule with the request, wherein the rule employs the broadcast condition to regulate return of the video to the mobile device; and
transmitting, by the mobile device, the request that includes the rule to an intermediate node configured to forward the request to the content service and add another rule to the request specifying to route the video to the mobile device through at least one alternate node intermediate to the mobile device and the content service, wherein the rule and the other rule are employable by the content service to return the video to the mobile device as a function of the rule and the other rule.

2. The method of claim 1, further comprising, in response to transmitting the request, receiving the video by the mobile device, wherein the content service, as a function of the rule, ascertains a condition under which it is permissible to broadcast the video.

3. The method of claim 1, further comprising, in response to transmitting the request, receiving the video, by the mobile device, via a broadcast service selected by the content service as a function of the rule.

4. The method of claim 1, further comprising transmitting, by the mobile device, a resource status indicator to the content service, wherein as a function of receiving the resource status indicator the content service adjusts a condition specified in the rule in regard to returning the video.

5. The method of claim 4, wherein the resource status indicator divulges that a threshold value associated with the at least one microprocessor has been surpassed, wherein the content service adjusts transmission of the video to the mobile device as a function of the threshold value.

6. The method of claim 4, wherein the resource status indicator evinces that a set point associated with a power source has been breached, wherein the content service adjusts transmission of the video to the mobile device as a function of the set point.

7. The method of claim 1, wherein the broadcast condition is at least one of: a transmission characteristic of a communication medium between the system and the content service; a reception characteristic of the communication medium between the system and the content service; an idle state of the microprocessor; an operating at full capacity state of the microprocessor; an available memory capacity associated with the mobile device; or an available power capacity associated with the mobile device.

8. The method of claim 1, further comprising, on receipt of the video from the content service, persisting the video, by the mobile device, in a secure location of at least one non-transitory computer readable medium.

9. A method, comprising:
receiving, by a system that includes at least one microprocessor, a request for a video, wherein the request includes a rule associated with a broadcast condition associated with a mobile device and the rule manages delivery of the video based on the broadcast condition, wherein the broadcast condition is predicted for a future time period based upon at least one characteristic associated with the mobile device;

receiving, by the system, another rule by a node that processed the request and is intermediate to the mobile device and the system specifying to route the video to the mobile device through at least one alternate node intermediate to the mobile device and the system; and transmitting, by the system, the video to the mobile device in satisfaction of the rule and the other rule.

10. The method of claim 9, further comprising ascertaining as a function of the rule, by the system, a time period during which to transmit the video to the mobile device.

11. The method of claim 9, further comprising ascertaining as a function of the rule, by the system, a broadcast service that is employed to transmit the video to the mobile device.

12. The method of claim 9, wherein the broadcast condition is at least one of: a transmission characteristic of a communication medium between the system and the mobile device; a reception characteristic of the communication medium between the system and the mobile device; an idle state of a microprocessor in the mobile device; an operating at full capacity state of the microprocessor; an available memory capacity associated with the mobile device; or an available energy capacity associated with the mobile device.

13. A mobile device, comprising:
at least one non-transitory computer readable medium having stored thereon computer-executable components;
at least one microprocessor that executes the following computer executable components stored on the at least one non-transitory computer readable medium:
an intelligence component that forecasts a broadcast condition associated with the mobile device at a future period in time based upon at least one characteristic associated with the mobile device;
a rule engine that generates a rule that governs delivery of a video to the mobile device as a function of the broadcast condition;
a generating component that creates a request for the video, wherein the request includes the rule; and
a transmitting component that relays the request to an intermediate node configured to forward the request to the content service and add another rule to the request specifying to route the video to the mobile device through at least one alternate node intermediate to the mobile device and the content service, wherein the rule and the other rule are employable by the content service to return the video to the mobile device as a function of the rule and the other rule.

14. The system of claim 13, wherein the broadcast condition is at least one of: a transmission characteristic of a communication medium between the mobile device and the video content service; a reception characteristic of the communication medium between the mobile device and the video content service; an idle state of the microprocessor; an operating at full capacity state of the microprocessor; an available memory capacity associated with the mobile device; or an available power associated with the mobile device.

15. The system of claim 13, further comprising an encryption component that, on receipt of the video from the content service, encrypts the video prior to persisting the video to the at least one non-transitory computer readable medium.

16. A system, comprising:
at least one non-transitory computer readable medium having stored thereon computer-executable components;
at least one microprocessor that executes the following computer executable-components stored on the at least one non-transitory computer readable medium:
a reception component that:
obtains a request for a video, wherein the request includes a rule associated with a broadcast condition under which a mobile device operates and the rule controls delivery of the video based on the broadcast condition, wherein the broadcast condition is predicted for a future time period based upon at least one characteristic associated with the mobile device, and
receives another rule by a node that processed the request and is intermediate to the mobile device and the system specifying to route the video to the mobile device through at least one alternate node intermediate to the mobile device and the system; and
a transmitter component that dispatches the video in conformance with the rule and the other rule.

17. The system of claim 16, wherein the transmitter component, as a function of the broadcast condition included in the rule, ascertains a time period during which to dispatch the video to the mobile device.

18. The system of claim 16, wherein the broadcast condition is at least one of: a transmission characteristic of a communication medium between the system and the mobile device; a reception characteristic of the communication medium between the system and the mobile device; an idle state of a microprocessor in the mobile device; an operating at full capacity state of the microprocessor; an available storage capacity associated with the mobile device; or an available power capacity associated with the mobile device.

* * * * *